United States Patent
Yamaguchi et al.

(10) Patent No.: US 8,899,581 B2
(45) Date of Patent: Dec. 2, 2014

(54) IMAGE PROCESSING APPARATUS, ROTATION CONTROL METHOD FOR MOTOR, AND COMPUTER-READABLE RECORDING MEDIUM

(71) Applicant: Konica Minolta, Inc., Chiyoda-ku (JP)

(72) Inventors: Hiroshi Yamaguchi, Toyokawa (JP); Takaki Kato, Toyokawa (JP); Yuta Tachibana, Toyokawa (JP); Yuji Kobayashi, Toyohashi (JP); Satoshi Teshima, Okazaki (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/159,529

(22) Filed: Jan. 21, 2014

(65) Prior Publication Data

US 2014/0205340 A1    Jul. 24, 2014

(30) Foreign Application Priority Data

Jan. 21, 2013  (JP) .................................. 2013-008629

(51) Int. Cl.
| | |
|---|---|
| *B65H 5/34* | (2006.01) |
| *G03G 15/16* | (2006.01) |
| *B65H 5/06* | (2006.01) |
| *B65H 29/68* | (2006.01) |

(52) U.S. Cl.
CPC ............. *G03G 15/167* (2013.01); *B65H 5/06* (2013.01); *B65H 29/68* (2013.01)
USPC ........................................................ 271/270

(58) Field of Classification Search
CPC .......... B65H 5/06; B65H 5/066; B65H 29/20; B65H 29/68; B65H 2513/108
USPC .......................................... 271/270, 314, 202
See application file for complete search history.

(56) References Cited

U.S. PATENT DOCUMENTS

| | | | | |
|---|---|---|---|---|
| 6,798,989 B2 | | 9/2004 | Higuma | |
| 8,474,815 B2 | * | 7/2013 | Takahashi | ...................... 271/270 |
| 8,474,816 B2 | * | 7/2013 | Ishizaki et al. | ................ 271/270 |
| 8,503,922 B2 | * | 8/2013 | Maeda et al. | ................. 399/396 |
| 8,632,067 B2 | * | 1/2014 | Awano | ........................... 271/207 |

FOREIGN PATENT DOCUMENTS

| | | |
|---|---|---|
| JP | 1-268471 A | 10/1989 |
| JP | 2004-85838 A | 3/2004 |

* cited by examiner

*Primary Examiner* — David H Bollinger
(74) *Attorney, Agent, or Firm* — Buchanan Ingersoll & Rooney PC

(57) ABSTRACT

An image processing apparatus includes: a transport roller for transporting a sheet subjected to image processing; a motor that drives the transport roller to rotate; and a speed reduction unit that performs a speed reduction control on the motor to temporarily stop the sheet, the speed reduction control being performed in a manner that a stopping time and a stopping distance each satisfy a corresponding target range, wherein the speed reduction control includes: a first control that is a control of reducing a rotation speed of the motor to a reference speed through at least two operations from among a braking operation, a powering operation, and a free running operation; and a second control that is a control of, after a rotation amount of the motor from the start of the speed reduction control reaches a reference value, continuously performing the braking operation until the stop of the motor.

27 Claims, 25 Drawing Sheets

| Time elapsed since start of speed reduction [ms] | Reference rotation speed [min⁻¹] |
|---|---|
| 0 | Vct |
| . . . | . . . |
| t1 | V1 (< Vct) |
| . . . | . . . |
| t2 | V2 (< V1) |
| . . . | . . . |
| t3 | V3 (< V2) |
| . . . | . . . |
| tb | 0 |

| Time elapsed since start of speed reduction [ms] | Reference pulse count |
|---|---|
| 0 | 0 |
| . . . | . . . |
| t1 | P1 |
| . . . | . . . |
| t2 | P2 (> P1) |
| . . . | . . . |
| t3 | P3 (> P2) |
| . . . | . . . |
| tb | Pz |

<Brake stop characteristics associated with variations in motor drive load>

<Free-run stop characteristics associated with variations in motor drive load>

210

| Average voltage value Vdave [V] of speed adjustment signal | Free running time Tf [ms] |
|---|---|
| Vdmin (under minimum drive load) | 0 |
| . . | . . |
| Va | Tfa |
| . . | . . |
| Vdmax (under maximum drive load) | TF |

| Difference Vk (= Vdave − Vdmin) [V] | Free running time Tf [ms] |
|---|---|
| $0 \leq Vk < V\alpha$ | 0 |
| $V\alpha < Vk \leq V\beta$ | 15 |
| $V\beta \leq Vk$ | 30 |

| Difference Vm (= Vdmax − Vdave) [V] | Free running time Tf [ms] |
|---|---|
| $0 \leq Vm < Vn$ | 35 |
| $Vn \leq Vm < Vp$ | 20 |
| $Vp \leq Vm$ | 5 |

<u>312</u>

| Difference Vr<br>(= Vdmax − Vdave) [V] | Braking time Tb<br>[ms] |
|---|---|
| 0 ≤ Vr < Vu | 5 |
| Vu ≤ Vr < Vw | 20 |
| Vw ≤ Vr | 35 |

IMAGE PROCESSING APPARATUS, ROTATION CONTROL METHOD FOR MOTOR, AND COMPUTER-READABLE RECORDING MEDIUM

This application is based on an application No. 2013-8629 filed in Japan, the contents of which are hereby incorporated by reference.

BACKGROUND OF THE INVENTION (1) Field of the Invention

The present invention relates to an image processing apparatus for transporting a sheet subjected to image processing by a transport roller, a rotation control method for a motor provided in the image processing apparatus, and a computer-readable recording medium.

(2) Description of the Related Art

Examples of the image processing apparatus include an image forming apparatus, such as a printer, and the image forming apparatus includes a sheet transport device for transporting a sheet, such as paper, on which an image is to be formed.

In general, the sheet transport device includes transport rollers arranged along a sheet transport path at intervals shorter than the length of a sheet in a sheet transport direction, and sequentially transports the sheet from a transport roller located upstream in the sheet transport direction to a transport roller located downstream in the sheet transport direction.

As a specific example of transporting a sheet, a so-called registration operation is known in which a sheet is transported to a transfer position at the timing of forming an image on an image carrier.

The registration operation is performed as follows. Suppose that a pair of transport rollers is arranged along a transport direction, and that a pair of registration rollers is arranged more downstream than the pair of transport rollers. In this case, while a sheet is transported by the pair of transport rollers, a leading edge of the sheet in the transport direction is pressed against the pair of registration rollers which is in a state of non-rotation at the downstream side. When a loop (warp) is formed in a leading end portion of the sheet to correct skew (oblique transport), the rotation of the pair of transport rollers is temporarily stopped. Subsequently, the rotation of both the pair of transport rollers and the pair of registration rollers is restarted (i.e., the transport is resumed) at the timing of forming an image.

The temporary stop of the pair of transport rollers is performed by applying a brake to stop the rotation of a motor which is a drive source of the pair of transport rollers. The brake referred to here is, for example, a so-called short brake in which both ends of each coil of the motor are electrically shorted out. However, if, during a speed reduction period from the start of the brake application to the stop of the motor, the transport amount of a sheet is varied due to variations in the load on a drive mechanism for transmitting the drive force from the motor to the pair of transport rollers, then the size of the loop will vary. This may lead to a failure in skew correction.

A known method for suppressing occurrence of such variations is to perform a speed reduction control on the rotation of the motor.

Japanese Patent Application Publication No. 2004-85838 discloses a feedback control performed on a camera having a function of moving a lens (movable body) by a motor for the purpose of auto focus adjustment. In the feedback control adjustment, when the speed of the lens in motion is reduced to stop the lens, a difference between the actual speed of the lens and a target speed is determined based on the duration of each pulse interval of a pulse signal output along with the movement of the lens. If the actual speed is higher than the target speed, the brake is applied to the lens. If the actual speed is lower than the target speed, the speed of the lens is increased.

However, in the above case where the speed adjustment is performed based on the duration of each pulse interval while the speed of the motor is reduced, the following problem may occur. Specifically, in the above speed adjustment, the lower the speed of the motor, the longer the cycle of the pulse signal and the longer the pulse interval. As a result, the waiting time for pulse input becomes longer.

When the waiting time for pulse input becomes longer, even if there is an attempt to perform speed adjustment repeatedly during the time period from a low-rotation period, in which the motor is driven at low speed, to the stop of the motor, the number of times speed adjustment can be performed will be limited. This is because speed adjustment cannot be performed during the waiting time.

For example, suppose that the brake is applied in the first speed adjustment performed during the low-rotation period, and that the motor stops during the waiting time for pulse input for the second speed adjustment after the first speed adjustment. In this case, the brake of the first speed adjustment is continuously applied to the stop of the motor.

This means that even if the speed of the motor is slightly higher than the target speed at the time of the first speed adjustment, the brake is continuously applied after the first speed adjustment. As a result, the speed of the motor is reduced to a great extent, and the transport amount (stopping distance) traveled by a sheet during the period from the start of the speed reduction to the stop of the sheet becomes shorter than the original transport amount.

On the other hand, suppose that the speed of the motor is increased in the first speed adjustment, and that the motor stops during the waiting time for pulse input for the second speed adjustment after the first speed adjustment. In this case, even if the speed of the motor is slightly lower than the target speed at the time of the first speed adjustment, the speed of the motor is continuously increased. Since the speed of the motor is not reduced sufficiently, the stopping distance becomes longer than the original stopping distance. As a result, the time required from the start of speed reduction to the stop of the sheet (stopping time) becomes longer.

As described above, the speed adjustment control by increasing or decreasing the speed of the motor cannot stabilize the stopping distance during the period from the low-rotation period to the stop of the motor, and such a speed adjustment control may lengthen the stopping time.

When the stopping time of the motor is lengthened, and the resumption of the transport of the sheet during the registration operation is delayed, the sheet cannot be transported to the transfer position at an appropriate timing for image formation. To avoid such a situation, it is possible to delay the timing of image formation. However, this solution is not preferable since it will lower the productivity of image formation.

The above problem does not only apply to an image forming apparatus, but also to an image reading apparatus, such as a scanner, that transports a sheet (e.g., document) to a reading position to read an image on the sheet, and that has a function of temporarily stopping the transport of the sheet and resuming the transport of the sheet to the reading position at the timing of reading the image.

The above problem also applies to an image forming apparatus that does not need to form a loop to correct skew but has a function of: temporarily stopping a sheet that is being transported in a state where a leading edge of the sheet is in contact with a pair of registration rollers; and resuming the transport of the sheet at the timing of image formation.

SUMMARY OF THE INVENTION

The present invention aims to provide an image processing apparatus, a motor rotation control method, and a computer-readable recording medium storing a computer program for a motor rotation control that each suppress variations in the stopping distance and the stopping time of a sheet during speed reduction of a motor.

The above aim is achieved by an image processing apparatus including a transport roller for transporting a sheet subjected to image processing, the image processing apparatus comprising: a motor configured to drive the transport roller to rotate; and a speed reduction unit configured to perform a speed reduction control on the motor to temporarily stop the sheet that is being transported, the speed reduction control being performed in a manner that a stopping time and a stopping distance each satisfy a corresponding target range, the stopping time being a time period from a start of the speed reduction control to a stop of the sheet, and the stopping distance being a distance traveled by the sheet from the start of the speed reduction control to the stop of the sheet, wherein the speed reduction control includes a first control and a second control following the first control, the first control is a control of reducing a rotation speed of the motor to a reference speed through at least two operations from among a braking operation, a powering operation, and a free running operation, the at least two operations including the braking operation, and the reference speed being a speed lower than a rotation speed Vct that is a speed of the motor at the start of the speed reduction control, and the second control is a control of, after a rotation amount of the motor from the start of the speed reduction control reaches a reference value, continuously performing the braking operation until the stop of the motor.

The above aim is also achieved by a rotation control method for a motor provided in an image processing apparatus, the image processing apparatus including a transport roller that is driven to rotate by the motor and that is for transporting a sheet subjected to image processing, the rotation control method comprising a speed reduction step of performing a speed reduction control on the motor to temporarily stop the sheet that is being transported, the speed reduction control being performed in a manner that a stopping time and a stopping distance each satisfy a corresponding target range, the stopping time being a time period from a start of the speed reduction control to a stop of the sheet, and the stopping distance being a distance traveled by the sheet from the start of the speed reduction control to the stop of the sheet, wherein the speed reduction step includes a first control step and a second control step following the first control step, the first control step is a step of reducing a rotation speed of the motor to a reference speed through at least two operations from among a braking operation, a powering operation, and a free running operation, the at least two operations including the braking operation, and the reference speed being a speed lower than a rotation speed Vct that is a speed of the motor at the start of the speed reduction control, and the second control step is a step of, after a rotation amount of the motor from the start of the speed reduction control reaches a reference value, continuously performing the braking operation until the stop of the motor.

The above aim is further achieved by a non-transitory computer-readable recording medium storing thereon a computer program for controlling an image processing apparatus, the image processing apparatus including a motor and a transport roller that is driven to rotate by the motor and that is for transporting a sheet subjected to image processing, the computer program causing the image processing apparatus to perform a speed reduction step of performing a speed reduction control on the motor to temporarily stop the sheet that is being transported, the speed reduction control being performed in a manner that a stopping time and a stopping distance each satisfy a corresponding target range, the stopping time being a time period from a start of the speed reduction control to a stop of the sheet, and the stopping distance being a distance traveled by the sheet from the start of the speed reduction control to the stop of the sheet, wherein the speed reduction step includes a first control step and a second control step following the first control step, the first control step is a step of reducing a rotation speed of the motor to a reference speed through at least two operations from among a braking operation, a powering operation, and a free running operation, the at least two operations including the braking operation, and the reference speed being a speed lower than a rotation speed Vct that is a speed of the motor at the start of the speed reduction control, and the second control step is a step of, after a rotation amount of the motor from the start of the speed reduction control reaches a reference value, continuously performing the braking operation until the stop of the motor.

BRIEF DESCRIPTION OF THE DRAWINGS

These and the other objects, advantages and features of the invention will become apparent from the following description thereof taken in conjunction with the accompanying drawings that illustrate a specific embodiment of the invention.

In the drawings:

FIG. 10 shows an example of the structure of a reference rotation speed table;

FIG. 12 shows an example of the structure of a reference pulse count table;

FIG. 21A shows an example of the structure of a table showing the correspondence between free running times and differences each obtained by subtracting a minimum voltage value from an average voltage value of the speed adjustment signal, and FIG. 21B shows an example of the structure of a table showing the correspondence between free running times and differences each obtained by subtracting an average voltage value from a maximum voltage value of the speed adjustment signal;

DESCRIPTION OF THE PREFERRED EMBODIMENTS

The following describes embodiments of an image processing apparatus and a rotation control method for a motor according to the present invention, based on an example of a tandem color printer (hereinafter, simply "printer").

EMBODIMENT 1

The following describes a feedback control which is a control of switching between braking and powering during the time period from when the rotation speed of a motor starts being reduced to when the rotation speed of the motor is reduced to a reference speed Vc1.

[1] Overall Structure of Printer

Figure 1:
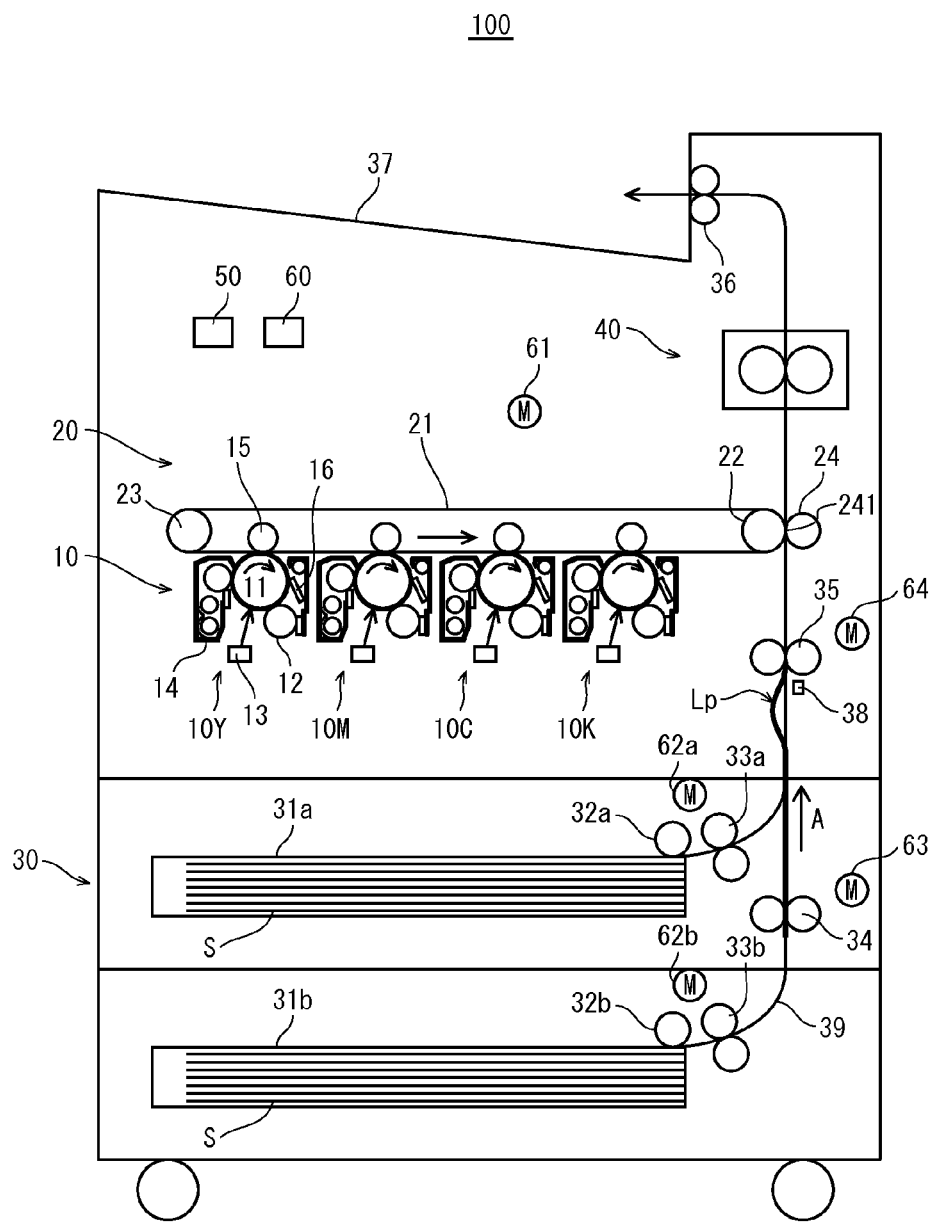
FIG. 1 shows an overall structure of a printer according to Embodiment 1.

FIG. 1 shows an overall structure of a printer 100.

As shown in FIG. 1, the printer 100 forms an image by using a well-known electrophotographic method. The printer 100 is connected to a network (e.g., LAN), and includes an image processing unit 10, an intermediate transfer unit 20, a paper feed unit 30, a fixing unit 40, an overall control unit 50, and a motor control unit 60. Upon receiving an instruction for executing a print job from an external terminal device (not illustrated), the printer 100 forms a color image composed of yellow (Y), magenta (M), cyan (C), and black (K) based on the instruction.

The image processing unit 10 includes imaging units 10Y, 10M, 10C, and 10K corresponding to the colors Y, M, C, and K, respectively.

The imaging unit 10Y includes a photosensitive drum 11, and also includes a charging unit 12, an exposure unit 13, a developing unit 14, a primary transfer roller 15, and a cleaner 16 which are provided around the photosensitive drum 11. The cleaner 16 is provided to clean the photosensitive drum 11. The imaging unit 10Y forms a toner image of the color Y on the photosensitive drum 11. The other imaging units 10M, 10C, and 10K have the same structure as the imaging unit 10Y, and thus the reference signs for the components of these imaging units are omitted in FIG. 1. Each of the imaging units 10M, 10C, and 10K forms a toner image of a corresponding color on the photosensitive drum 11.

The intermediate transfer unit 20 includes: an intermediate transfer belt 21 that rotates in the direction of the arrow; a driving roller 22 and a driven roller 23 around which the intermediate transfer belt 21 is wound in a taut condition; and a secondary transfer roller 24 that faces the driving roller 22 with the intermediate transfer belt 21 therebetween, and that is pressed against the intermediate transfer belt 21.

The paper feed unit 30 functions as a sheet transport device, and includes paper feed cassettes 31a and 31b, feed rollers 32a and 32b, pairs of transport rollers 33a, 33b, and 34, and a pair of registration rollers 35. Hereinafter, the pairs of transport rollers are simply referred to as transport rollers, and the pair of registration rollers is referred to as registration rollers, unless each of these pairs need to be explicitly referred to as a pair.

The paper feed cassette 31a and the paper feed cassette 31b provided below the paper feed cassette 31a each contain sheets S as recording sheets.

The feed rollers 32a and 32b feed the sheets S one by one from the paper feed cassettes 31a and 31b to a conveyance path 39. Each of the transport rollers 33a and 33b further transport the sheet S to a downstream side in a transport direction.

The transport rollers 34 are provided more downstream in the transport direction than the transport rollers 33b, and more upstream in the transport direction than the registration rollers 35. The transport rollers 34 transport the sheet S from the transport rollers 33b to the registration rollers 35 in the direction of the arrow A.

The registration rollers 35 adjust the timing to transport the sheet S transported from either the transport rollers 33a or 34 to the secondary transfer roller 24.

The feed roller 32a and the transport rollers 33a are driven to rotate by a transport motor 62a. The feed roller 32b and the transport rollers 33b are driven to rotate by a transport motor 62b. The transport rollers 34 are driven to rotate by a transport motor 63. The registration rollers 35 are driven to rotate by a registration motor 64. Each pair of rollers may have a structure where at least one of the pair of rollers is driven to rotate.

The rotatable bodies except those in the paper feed unit 30, such as the photosensitive drums 11 and the intermediate transfer belt 21, are driven to rotate by a drive motor 61. These motors are DC brushless motors, and the rotation thereof is controlled by the motor control unit 60.

The fixing unit 40 includes a fixing roller and a pressing roller. The fixing unit 40 heats the sheet S at a predetermined fixing temperature and applies pressure to the sheet S to fix the toner images on the sheet S.

The overall control unit 50 converts image signals transmitted from an external terminal device into digital signals of the colors Y to K, generates drive signals for driving the respective exposure units 13 in the imaging units 10Y to 10K, and drives the exposure units 13 using the drive signals. As a result, the exposure units 13 emit laser beams to exposure-scan the respective photosensitive drums 11.

Note that the photosensitive drums 11 of the imaging units 10Y to 10K are uniformly charged by the charging units 12 before the aforementioned exposure scanning. With the exposure by the laser beams, electrostatic latent images are formed on the photosensitive drums 11. The electrostatic latent images are then developed by developer contained in the developing units 14, and toner images are formed on the photosensitive drums 11.

The toner images formed on the photosensitive drums 11 are primary-transferred onto the intermediate transfer belt 21 by the primary transfer rollers 15. At this time, the imaging units 10Y to 10K form the toner images at different timings, so that the toner images are sequentially transferred and superposed on each other at the same position on the intermediate transfer belt 21.

After being superposed on the intermediate transfer belt 21, the toner images of the respective colors are conveyed to a secondary transfer position 241 by the rotation of the intermediate transfer belt 21. The secondary transfer position 241 is a position at which the secondary transfer roller 24 is pressed against the intermediate transfer belt 21. At this secondary transfer position 241, the toner images on the intermediate transfer belt 21 (i.e., image carrier) are transferred onto the sheet S.

At the timing at which the imaging units 10Y to 10K form the toner images, the paper feed unit 30 feeds the sheet S via the registration rollers 35. The sheet S passes between the secondary transfer roller 24 and the intermediate transfer belt 21 that is rotating. Due to the electrostatic force, which results from the electric field generated by a secondary transfer voltage supplied to the secondary transfer roller 24, the toner images of the respective colors on the intermediate transfer belt 21 are collectively secondary-transferred onto the sheet S at the secondary transfer position 241.

After passing through the secondary transfer position 241, the sheet S is transported to the fixing unit 40 at which the toner images are fixed to the sheet S by heat and pressure. Subsequently, the sheet S passes through a pair of ejection rollers 36 and is ejected onto a paper tray 37.

A registration sensor 38 is arranged at a position that is: near the registration rollers 35 and the conveyance path 39; more downstream than the transport rollers 34 in the sheet transport direction; and more upstream than the registration rollers 35 in the sheet transport direction. The registration sensor 38 is provided for detecting the sheet S that is being transported.

Specifically, the registration sensor 38 detects, for each of the sheets S, a leading edge of the sheet S in the transport direction, and transmits a detection signal indicating the leading edge to the motor control unit 60.

The motor control unit 60 controls the rotation and stop of each motor based on an instruction from the overall control unit 50. Also, the motor control unit 60 performs a registration operation for forming a loop Lp at the leading end portion of the sheet S based on the detection signal from the registration sensor 38.

[2] Registration Operation

Figure 2:
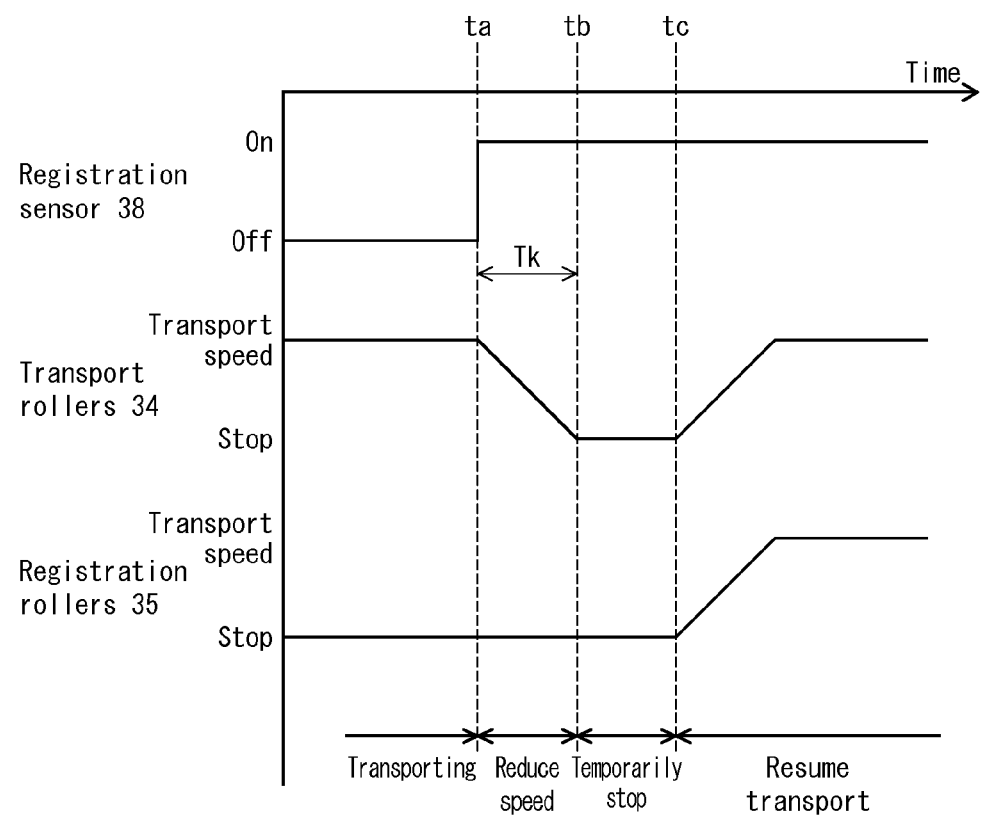
FIG. 2 is a timing chart showing a registration operation.

FIG. 2 is a timing chart showing the registration operation performed on a sheet S fed from the paper feed cassette 31b.

Before a time point ta in FIG. 2, the sheet S is being transported toward the registration rollers 35 at a predetermined transport speed (system speed). Here, the sheet S is transported by the rotation of the transport rollers 34, and during this transport, the rotation of the registration rollers 35 has stopped.

Upon receiving the detection signal (ON) indicating the leading edge of the sheet S from the registration sensor 38 at the time point ta, the motor control unit 60 causes the transport motor 63 to reduce speed and stop so as to stop the rotation of the transport rollers 34 (time point tb).

During a speed reduction period Tk, which is a time period from when the leading edge of the sheet S is detected by the registration sensor 38 and the sheet S reaches the nip between the pair of registration rollers 35 that has stopped (the nip being a portion at which one of the registration rollers 35 is in contact with the other) to when the transport rollers 34 stop, a loop Lp having a size within a target range is formed in the sheet S (see FIG. 1).

During a time period from the time point tb to a time point tc, the motor control unit 60 causes the transport motor 63 and the registration motor 64 to stop so that the rotation of the transport rollers 34 and the registration rollers 35 stops, and that the transport of the sheet S is temporarily stopped. Although not illustrated, the secondary transfer roller 24 keeps rotating at the system speed from the start of image formation, regardless of whether the transport rollers 34 and the registration rollers 35 stop rotating or not.

The time point tc indicates a predetermined transport resumption timing at which the transport of the sheet S is resumed. The transport resumption timing is determined in advance based on the timing at which the imaging units 10Y to 10K form toner images (image formation), and this determination is performed in a manner that the time point at which a leading edge of an image forming area on the intermediate transfer belt 21 equivalent to one page reaches the secondary transfer position 241 coincides with the time point at which the leading edge of the sheet S whose transport has been resumed reaches the secondary transfer position 241.

In the present embodiment, every time the transport resumption timing of one of the sheets S arrives, the overall control unit 50 transmits an instruction signal indicating the arrival of the transport resumption timing of the sheet S to the motor control unit 60.

Upon receiving the instruction signal from the overall control unit 50 (time point tc), the motor control unit 60 activates the transport motor 63 and the registration motor 64, so that the transport rollers 34 and the registration rollers 35 start rotating to resume transport of the sheet S, and transport the sheet S to the secondary transfer position 241 at the system speed.

In the above, the description is provided of the registration operation performed on a sheet S fed from the paper feed cassette 31b. Note that a similar registration operation is performed on a sheet S fed from the paper feed cassette 31a, and in this case, the transport motor 62a for driving the transport rollers 33a to rotate is targeted for the control of speed reduction, stop, and transport resumption.

[3] Structures of Motor Control Unit 60 and Transport Motor 63

Figure 3:
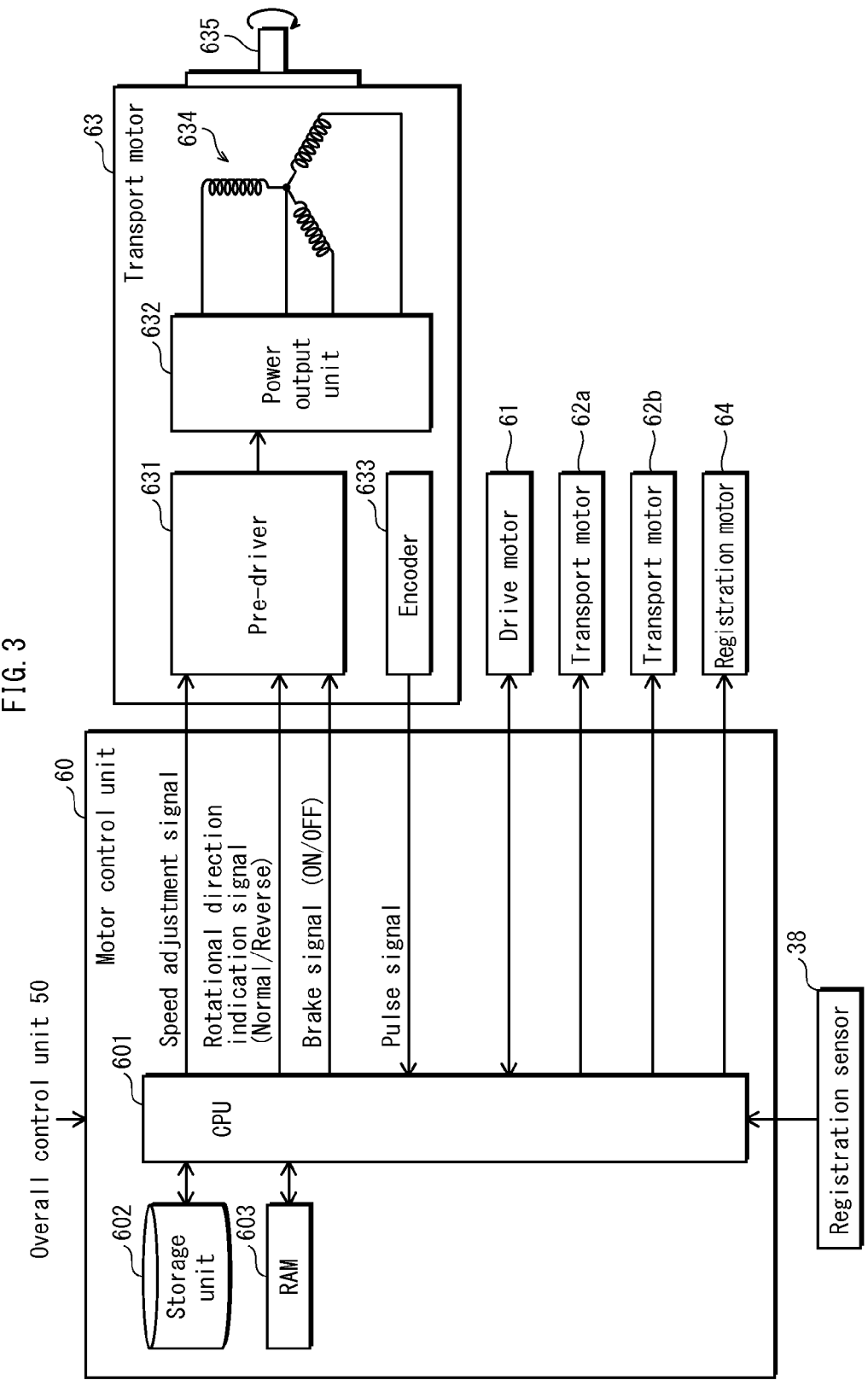
FIG. 3 is a block diagram showing the structures of a motor control unit and a transport motor.

FIG. 3 is a block diagram showing the structures of the motor control unit 60 and the transport motor 63.

As shown in FIG. 3, the motor control unit 60 includes a CPU (Central Processing Unit) 601, a storage unit 602, and a RAM (Random Access Memory) 603. The transport motor 63 includes a pre-driver 631, a power output unit 632, an encoder 633, and coils 634.

The CPU 601 of the motor control unit 60 performs a feedback control on the rotation of each motor, such as the transport motor 63, except during a speed reduction control. Details of the speed reduction control is described later.

In the case of the transport motor 63, the CPU 601 outputs a speed adjustment signal, a rotational direction indication signal, and a brake signal to the pre-driver 631 of the transport motor 63, and receives a pulse signal from the encoder 633 of the transport motor 63.

The speed adjustment signal indicates driving or stopping of the transport motor 63. In the case of driving of the transport motor 63, the speed adjustment signal further indicates whether to increase or reduce speed of the transport motor 63. If the pre-driver 631 of the transport motor 63 is designed to perform control using voltage, the speed adjustment signal is a voltage value. If the pre-driver 631 is designed to perform control using PWM, the speed adjustment signal is a PWM value. Specifically, a control for driving or stopping the transport motor 63 is performed as follows. That is, in the case of using voltage, control is performed so that the transport motor 63 rotates at a rotation speed proportional to a voltage value. In the case of using PWM, control is performed so that the transport motor 63 rotates at a rotation speed proportional to (or, in the case of a low-active mode, inversely proportional to) a duty ratio at 25 kHz (at a cycle of 40 μs).

As a representative example, the following describes a case where the transport motor 63 performs control using a voltage value. However, the transport motor 63 can perform similar control using a PWM value.

The rotational direction indication signal indicates either normal rotation or reverse rotation.

The brake signal indicates whether a brake is to be on (applied) or off (not applied).

Note that the brake refers to a so-called short brake in which both ends of each coil 634 in the transport motor 63 are electrically shorted out. The coils 634 may be shorted out by grounding the respective ends of the coils 634.

The pulse signal is a signal output from the encoder 633 as a rotational shaft 635 of the transport motor 63 rotates. When the rotational shaft 635 of the transport motor 63 rotates once, N pulses are output. In the present embodiment, 200 pulses are output per rotation.

While the transport motor 63 is rotating, the CPU 601 receives a pulse signal from the encoder 633, and counts (cumulatively adds) the number of pulses to obtain a pulse count Pc. Based on the pulse count Pc, the CPU 601 detects the amount of rotation of the rotational shaft 635 of the transport motor 63, i.e., how many times the rotational shaft 635 has rotated since the counting of pulses started.

For example, if the pulse count Pc has increased from 1 to 200, it can be determined that the rotational shaft 635 of the transport motor 63 has rotated once. It is possible to calculate in advance that when the pulse count Pc is 1, the sheet transport distance is Lz. In this way, when the pulse count Pc has increased from 0 to 200, it can be determined that a sheet S has been transported over a distance of 200×Lz. The amount of rotation of the rotational shaft 635 of the transport motor 63, which corresponds to the sheet transport distance, is hereinafter referred to as "motor rotation amount".

Also, by counting the number of pulses which are input per unit time, the rotation speed of the transport motor 63, i.e., the number of rotations per minute ($min^{-1}$) in the present example, can be detected.

Specifically, the storage unit 602 stores pulse/speed information in advance. The pulse/speed information indicates the number of input pulses per unit time and the rotation speed of the transport motor 63 in association with each other. The CPU 601 detects the rotation speed of the transport motor 63 (hereinafter "motor rotation speed") by obtaining, from the pulse/speed information, the rotation speed corresponding to the number of input pulses that has been counted. The detection is performed at predetermined intervals, for example, at intervals of one millisecond. During transport of a sheet S, the current motor rotation speed can be detected at micro time intervals.

The CPU 601 variably controls the amount of electric current (hereinafter, simply "current") flowing into the transport motor 63, by changing the voltage value of the speed adjustment signal so that the motor rotation speed is maintained at a predetermined speed. For example, during transport of a sheet S, the CPU 601 changes the voltage value of the signal so that the motor rotation speed is maintained at a speed corresponding to the system speed, and during the powering of the transport motor 63, which is described later, the CPU 601 changes the voltage value of the signal so that the motor rotation speed is maintained at the reference speed.

Specifically, if the current motor rotation speed corresponds to a predetermined speed, the CPU 601 maintains the voltage value of the speed adjustment signal at the current voltage value. If the current motor rotation speed is lower than a predetermined speed, the CPU 601 raises the voltage value of the speed adjustment signal higher than the current voltage value. If the current motor rotation speed is higher than a predetermined speed, the CPU 601 lowers the voltage value of the speed adjustment signal lower than the current voltage value.

In this respect, it can be said that the CPU 601 functions as a control unit that variably controls the amount of current flowing into the transport motor 63 so that the motor rotation speed is maintained at a predetermined speed, such as the system speed. Also, it can be said that the speed adjustment signal indicates the amount of current flowing into the transport motor 63.

When driving of the transport motor 63 is instructed by the CPU 601 using the speed adjustment signal, and the brake signal indicates that the brake is to be off, then the pre-driver 631 outputs, to the power output unit 632, a drive instruction indicating (i) the rotational direction (normal rotation or reverse rotation) and (ii) whether to increase, reduce, or maintain the speed based on the voltage indicated by the speed adjustment signal.

When stopping of the transport motor 63 is instructed by the CPU 601, the pre-driver 631 outputs a stop instruction to the power output unit 632, and, if the brake signal indicates that the brake is to be on, the pre-driver 631 further outputs a brake instruction to the power output unit 632.

The power output unit 632 is composed of, for example, a switching circuit that varies the current supplied to the coils 634 by switching a switching element. When the instruction from the pre-driver 631 is a drive instruction, the power output unit 632 supplies drive current to the coils 634 based on the drive instruction.

For example, when the pre-driver 631 instructs the power output unit 632 to increase speed as a result of a raise in the voltage value of the speed adjustment signal from the CPU 601, the power output unit 632 increases the current supplied to the coils 634 (current flowing into the transport motor 63). Conversely, when the pre-driver 631 instructs the power output unit 632 to reduce speed as a result of a drop in the voltage value of the speed adjustment signal, the power output unit 632 lowers the current supplied to the coils 634 to be smaller than the current that is currently being applied.

Also, upon receiving a stop instruction, the power output unit 632 stops the supply of the drive current to the coils 634, and upon receiving a brake instruction, the power output unit 632 applies the short brake by electrically shorting out both ends of each of the coils 634. This allows the transport motor 63 to drive, applies the brake, or stop as instructed by the CPU 601.

During the registration operation, the CPU 601 reduces the speed of the transport motor 63 and stops the transport motor 63, based on the detection signal from the registration sensor 38, and thereafter resumes driving of the transport motor 63.

Basically, the speed reduction of the transport motor 63 is performed by braking Suppose here that a brake is continuously applied from the start of the speed reduction of the transport motor 63 to the stop of the transport motor 63. In this case, variations in the load on the transport motor 63 cause variations in the stopping time required from the start of speed reduction to the stop of the transport motor 63, and also cause variations in the transport amount (stopping distance) of a sheet S from the start of speed reduction to the stop of the transport motor 63.

Variations in the load on the transport motor 63 are caused by factors such as: variations in a load torque (mN·m) and load inertia (g·cm$^2$) in a transmission mechanism for transmitting the drive force of the transport motor 63 to the transport rollers 34; and variations in the load on the rotational shaft 635 caused by variations in a motor coil temperature (° C.), motor inertia (g·cm$^2$), motor coil resistance (Ω), and motor magnetism (Wb/m$^2$). Hereinafter, the load on the transport motor 63 is referred to as "motor drive load".

To reduce variations in the stopping time and the stopping distance, a technique may be used in which speed adjustment is performed by a feedback control during the speed reduction of the motor, as described above. However, performing such speed adjustment in the low-rotation period (low-speed period) does not reduce variations but rather increases variations.

Accordingly, in the present embodiment, the speed reduction period from the start of speed reduction to the stop of the transport motor 63 is divided into a first period (high-speed period) and a second period (low-speed period) following the first period. Then, as a speed reduction control, a first control of performing the feedback control is performed in the first period, and, a second control of continuously applying the brake without performing the feedback control (i.e., while prohibiting the feedback control) is performed in the second period, so as to reduce variations in the stopping time and the stopping distance. In this respect, it can be said that the CPU 601 that performs a speed reduction control functions as a speed reduction unit that temporarily stops a sheet S, which is being transported, by means of the speed reduction control on the transport motor 63. Details of the speed reduction control are described below.

The storage unit 602 of the motor control unit 60 stores pieces of information used for the speed reduction control, such as the system speed, the reference speed, a reference value, a reference rotation speed table, and a threshold value (predetermined value), in addition to the aforementioned pulse/speed information.

The RAM 603 is a work area for the CPU 601.

Although the above describes the structure of the transport motor 63, the other motors also have a similar structure, and, except during the speed reduction control, the other motors are also subjected to a feedback control similar to the transport motor 63 so as to control the speed thereof. The speed reduction control is applied to the transport motors 62a and 63 which perform the registration operation. Since a similar speed reduction control is performed with respect to both the transport motors 62a and 63, the following description is provided with an example of the transport motor 63.

[4] Speed Reduction Control

Figure 4A:
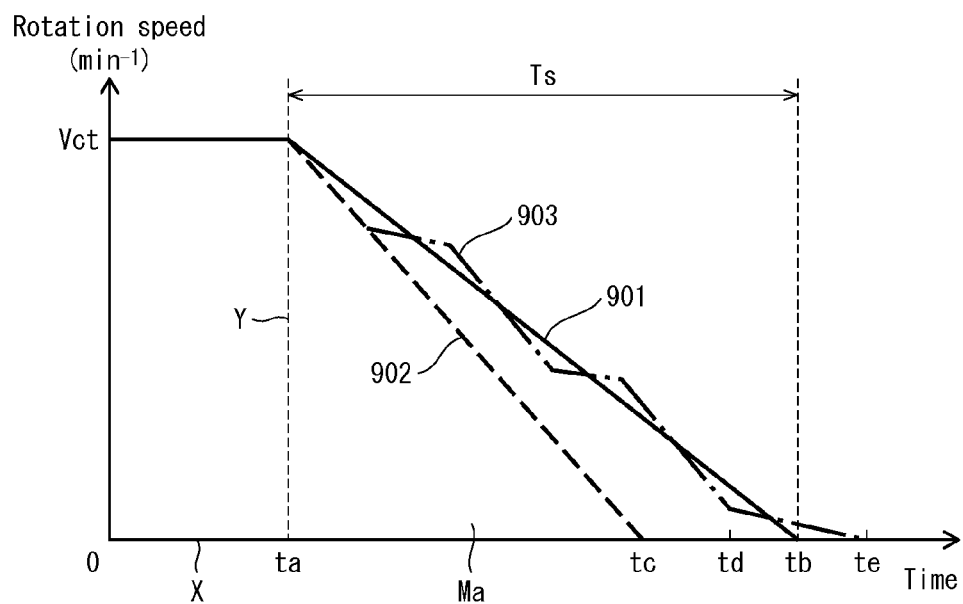
FIGS. 4A and 4B show details of a speed reduction control in a comparative example.
Figure 4B:
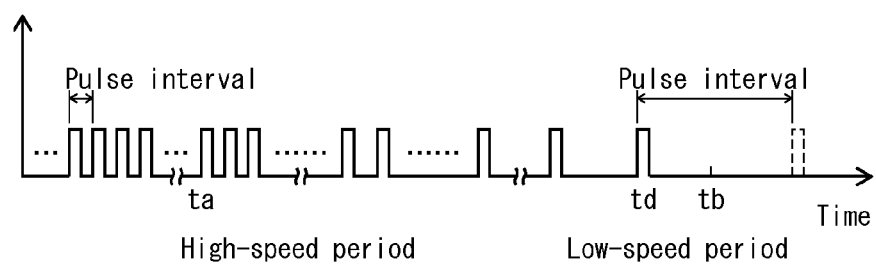

FIGS. 4A and 4B show the details of a speed reduction control in a comparative example, and FIGS. 5A to 5D show the details of a speed reduction control in the present embodiment. The following describes a speed reduction control in the comparative example and a speed reduction control in the present embodiment in the stated order.

[4-1] Speed Reduction Control in Comparative Example

FIGS. 4A and 4B each show a timing chart showing the speed reduction control in a comparative example. Specifically, FIG. 4A shows changes in the rotation speed V (min$^{-1}$) of the transport motor 63, and FIG. 4B shows an example of the waveforms of the pulses of a pulse signal output from the encoder 633. The horizontal axis represents time in milliseconds (ms).

A graph 901 in a solid line and a graph 902 in a dashed line each represent a case where the speed reduction control is performed by simply applying a brake. A graph 903 in an alternating long and short dashed line represents a case where the feedback control is performed by alternately repeating braking and powering.

The graph 901 shows changes in the motor rotation speed under a minimum load in which the motor drive load is assumed to be the smallest. A time point ta indicates the start of speed reduction, a time point tb indicates stop, and a period between the time points ta and tb is a speed reduction period (stopping time) Ts. Note that the minimum load is set in view of the dimensional tolerance of a drive mechanism, such as gears, and of load variations due to degradation over time. A maximum load, which is described later, is set in the same manner as the minimum load.

A motor rotation speed Vct at the time point ta corresponds to the system speed (transport speed). For example, the motor rotation speed Vct is 2000 min$^{-1}$. The inclination of the graph 901 corresponds to a speed reduction rate. The speed reduction rate under the minimum load is referred to as a reference speed reduction rate Gs.

In FIG. 4A, the horizontal axis represents time, and the vertical axis represents motor rotation speed. Accordingly, an area Ma, which is an area surrounded by the graph 901, the horizontal axis (X axis), and a Y axis that is an axis parallel to the vertical axis and that intersects the time point ta, corresponds to the motor rotation amount during speed reduction, i.e., the stopping distance of a sheet S.

Here, the stopping distance under the minimum load is indicated by a reference value Ls. The reference value Ls is set in advance such that the size of the loop Lp formed at the leading end portion of a sheet S stopped during the registration operation coincides with a reference value within a target value range.

On the other hand, the graph 902 shows changes in the motor rotation speed when the motor drive load is larger than the minimum load. From the graphs 901 and 902, it can be known that the speed reduction rate becomes larger than the reference speed reduction rate Gs when the motor drive load is larger than the minimum load.

This results in the stopping time (i.e., period between the time points ta and tc) being shorter than the speed reduction period Ts, which is a reference value, and the stopping distance being shorter the reference value Ls. When the stopping distance is shorter than the reference value Ts, the size of the loop Lp is likely to fall out of the target range greatly.

The graph 903 shows changes in the motor rotation speed when a feedback control is performed while the motor drive load is larger than the minimum load, and the feedback control is performed such that the speed of the transport motor 63 is reduced at the same speed reduction rate as the reference speed reduction rate Gs. The graph 903 is in a zigzag pattern, and the speed of the transport motor 63 is reduced by alternately repeating braking and powering, so that the speed reduction rate does not greatly deviate from the reference speed reduction rate Gs indicated by the graph 901 shown by a linear line.

However, after the speed control is switched from braking to powering for the last time at a time point td in the low-speed period immediately before stopping, the powering continues until the transport motor 63 stops at a time point te. As a result, the stopping time becomes longer than the reference value Ts.

This is because of the following reason.

As shown by the example of the waveforms of the pulse signal in FIG. 4B, the number of input pulses per unit time is reduced significantly in the low-speed period immediately before the stop of the transport motor 63, as compared to the high-speed period immediately after the start of speed reduction of the transport motor 63.

The smaller the number of input pulses, the longer the pulse interval between one input pulse and the next. In a case where the motor rotation speed is detected based on pulse intervals, a longer pulse interval leads to a longer waiting time for a next input pulse. As a result, it takes time to detect the motor rotation speed.

Since the motor rotation speed cannot be newly detected until the next input pulse, if the motor rotation speed is detected based on the input pulse at the time point td as shown in FIG. 4A, and the detected value indicates that the motor rotation speed is lower than a target speed (i.e., the motor rotation speed at the time point td when the speed is reduced at the reference speed reduction rate Gs), then the transport motor 63 is powered. In this case, if the transport motor 63 stops before the input of the next pulse (shown by a dashed line in FIG. 4B), this means that the powering is continued until the stop of the transport motor 63.

A change in the amount of the motor drive load causes a change in the motor rotation speed at the time point td. Accordingly, if the detected value at the time point td indicates that the motor rotation speed is higher than the target speed, then the brake is applied to the transport motor 63, and the stopping time becomes shorter than in the case when the powering is performed.

The feedback control as shown by the graph 903 can reduce variations in the stopping time and the stopping distance due to variations in the motor drive load, as compared to the control of simply applying the brake as shown by the graph 902. However, the feedback control is not reliable, and still cannot completely eliminate variations.

[4-2] Speed Reduction Control According to Embodiment 1

Figure 5A:
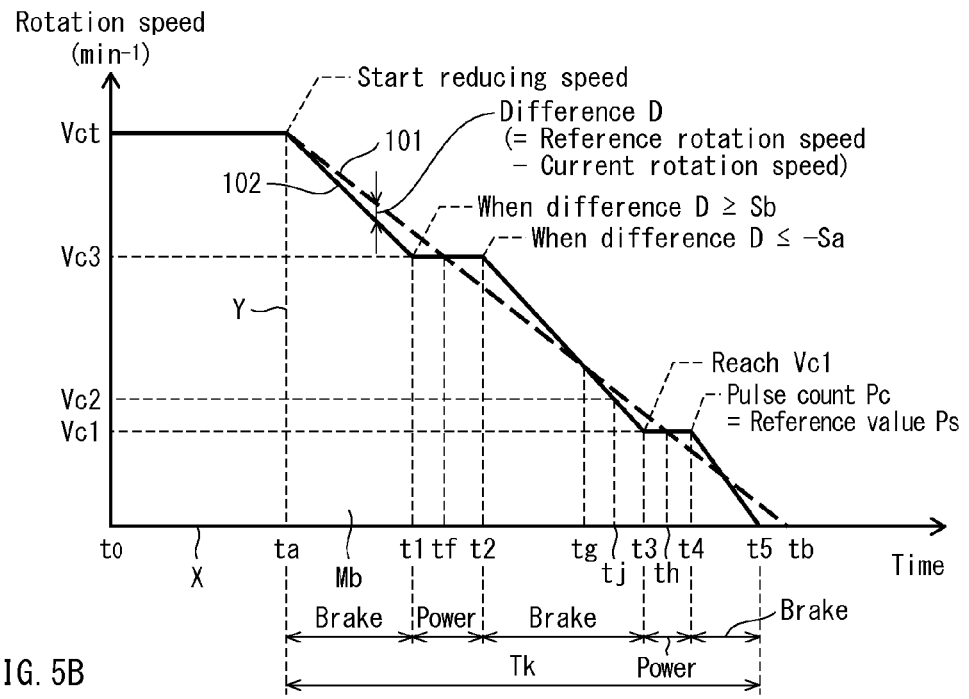
FIGS. 5A to 5D show details of a speed reduction control according to Embodiment 1.
Figure 5B:
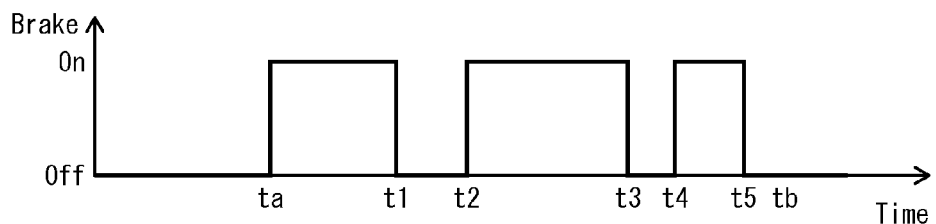
Figure 5C:
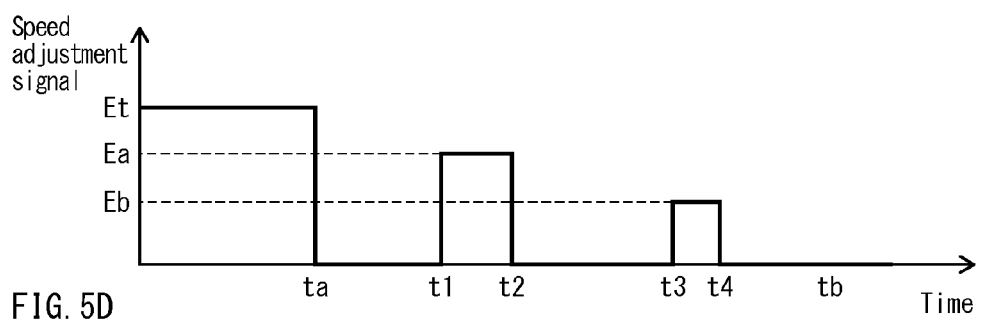
Figure 5D:
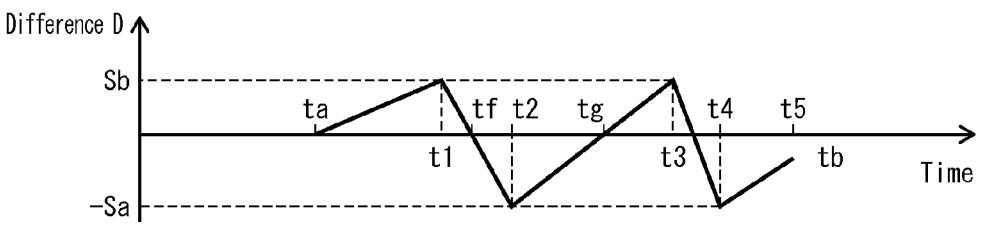

FIGS. 5A to 5D each show a timing chart showing details of a speed reduction control according to Embodiment 1. Specifically, FIG. 5A shows changes in the motor rotation speed, FIG. 5B shows the timing of switching the brake signal between on and off, FIG. 5C shows changes in the voltage value of the speed adjustment signal, and FIG. 5D shows a graph indicating changes in a difference D between motor rotation speeds, which is described later.

In FIG. 5A, a graph 101 in a dashed line (corresponding to the graph 901 in FIG. 4A) shows an example in which the motor drive load is at minimum, and the speed of the transport motor 63 is assumed to be reduced at the reference speed reduction rate Gs by simply applying the brake from the start of speed reduction (time point ta) to the stop of the transport motor 63 (time point tb).

On the other hand, a graph 102 in a solid line shows an example in which the motor drive load is larger than the minimum load, and a feedback control and a brake control are performed during a first period and a second period, respectively. The first period is a period from the start of speed reduction (time point ta) to a time point t4, and the feedback control is performed during this first period so that the speed of the transport motor 63 is reduced according to the reference speed reduction rate Gs. The second period is a period from the time point t4 to the stop of the transport motor 63 (time point t5), and the brake control is performed during this second period so that the speed of the transport motor 63 is reduced by simply applying the brake to the transport motor 63.

Specifically, braking is started at the time point ta at which the rotation speed of the transport motor 63 is the motor rotation speed Vct, which is 2000 $min^{-1}$ in the present example.

When the motor drive load is at minimum, the brake is applied so that the motor rotation speed is reduced at the reference speed reduction rate Gs, as shown by the graph 101. Hereinafter, the rotation speed at each time point on the presumption that the motor rotation speed is reduced at the reference speed reduction rate Gs over time is referred to as a "reference rotation speed".

When the motor drive load is larger than the minimum load, as shown by the graph 102, the brake applied from the start of speed reduction causes the speed reduction rate (inclination) immediately after the time point ta to be larger than the graph 101 (reference speed reduction rate Gs), and the motor rotation speed becomes lower than the reference rotation speed.

Provided that a value obtained by subtracting the current motor rotation speed from the reference rotation speed is a difference D, the difference D increases over time (see the time points ta to t1 in FIG. 5D). As the difference D increases, the stopping distance becomes shorter.

When the difference D is larger than or equal to a value Sb, which is a positive threshold value (time point t1), powering is performed instead of braking Note that the aforementioned powering refers to a control of driving the transport motor 63 to rotate in a manner that the motor rotation speed is maintained at the current value, i.e., a rotation speed Vc3.

Specifically, powering is performed as follows. The CPU 601 detects the motor rotation speed at the end of braking using the pulse signal received from the encoder 633, sets the detected motor rotation speed to a target rotation speed, which is the rotation speed Vc3 in the present example, and performs a feedback control, i.e., variably controls the voltage of the speed adjustment signal, in a manner that the motor rotation speed detected from this point onwards coincides with the target rotation speed Vc3.

FIG. 5C shows an example in which the voltage of the speed adjustment signal is at a constant voltage of Ea during the aforementioned powering. However, the voltage of the speed adjustment signal may vary slightly due to the feedback control.

Since the powering starting from the time point t1 causes the motor rotation speed to be maintained at the rotation speed Vc3, which is the rotation speed at the time point t1, the difference D between the current motor rotation speed and the reference rotation speed decreases over time (between time points t1 to t2 in FIG. 5D). As the difference D decreases, the stopping distance becomes longer.

The difference D becomes zero at a time point tf, and becomes minus after the time point tf. When the difference D (negative) becomes smaller than or equal to a value −Sa over time, which is a negative threshold value (time point t2), braking is performed instead of powering.

Since braking is restarted from the time point t2 onwards, the motor rotation speed decreases and the difference D (negative) increases (approaches zero).

When the motor rotation speed becomes equal to the reference rotation speed over time, the difference D becomes zero (time point tg). When the motor rotation speed becomes smaller than the reference rotation speed, the difference D becomes positive, and becomes larger after the time point tg. As the difference D increases, the stopping distance becomes smaller, similarly to the aforementioned first braking control between the time points to and t1.

When the motor rotation speed is reduced to the reference speed Vc1 (time point t3), powering is performed instead of braking. This powering refers to a control of driving the transport motor 63 to rotate in a manner that the motor rotation speed is maintained at the reference speed Vc1. The reference speed Vc1 is set to be lower than the rotation speed Vct which is the rotation speed at the start of speed reduction. It is preferable that the reference speed Vc1 be approximately 400 min$^{-1}$ to 800 min$^{-1}$. In the present example, the reference speed Vc1 is set to 800 min$^{-1}$.

During the powering from the time point t3 onwards, when the pulse count (motor rotation amount) Pc, which is the number of pulses counted from the start of speed reduction (time point ta), reaches a reference value Ps (time point t4), braking (hereinafter "last braking") is performed instead of powering. This last braking is continued until the transport motor 63 is stopped (time point t5), regardless of the degree of the difference D.

Note that the reference value Ps corresponds to the pulse count Pc at a time point th at which the motor rotation speed under the minimum load reaches the reference speed Vc1 as shown in graph 101.

The last braking is started under the condition that the pulse count Pc reaches the reference value Ps, so that the motor rotation amount from the start of speed reduction to the start of the last brake can be the same regardless of whether the motor drive load is at minimum or not.

This eliminates the difference between (i) the motor rotation amount from the start of speed reduction to the start of the last brake when the drive load of the transport motor 63 is at minimum and (ii) the motor rotation amount from the start of speed reduction to the start of the last brake when the drive load of the transport motor 63 is not at minimum and the feedback control is performed. Accordingly, if a difference δ occurs between these motor rotation amounts during the time period from the start of the last brake to the stop of the transport motor 63 due to the amount of the drive load of the transport motor 63, then only the difference δ results in variations in the stopping distance.

In the case of the speed reduction control as described above, the following elements are important in determining the stopping distance and the stopping time: threshold values (−Sa and Sb) used for the feedback control in which braking and powering are repeated; and a waiting time for the start of the last brake until the pulse count Pc reaches the reference value Ps.

The following describes these elements in details.

Figure 6:
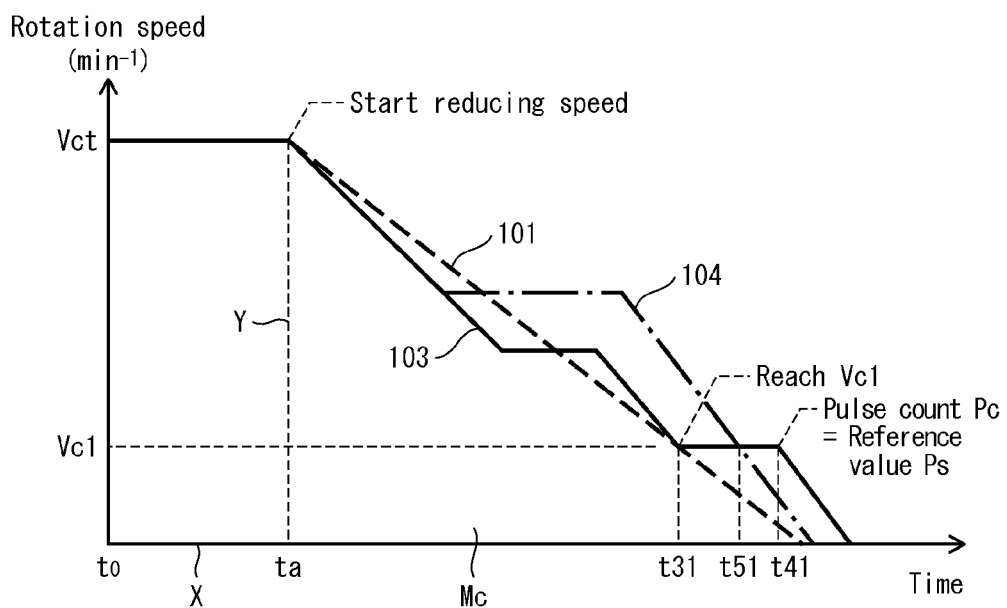
FIG. 6 is a timing chart showing a different speed reduction control.

In FIG. 6, a graph 103 shows an example in which the threshold value Sb, out of the threshold values (−Sa and Sb) used for the feedback control, is set to be too large.

In the speed reduction control shown by the graph 103, the stopping distance corresponds to an area Mc surrounded by the graph 103, the X axis, and the Y axis, similarly to the cases of the areas Ma in FIG. 4A and Mb in FIG. 5A. Accordingly, in order to equalize the stopping distance between the speed reduction control shown by the graph 103 and the speed reduction control shown by the graph 102 in FIG. 5A, the area Mc may be equalized with the area Mb in FIG. 5A.

In the speed reduction control shown by the graph 103 in FIG. 6, the threshold value Sb is set to be too large as compared to the case of the speed reduction control shown by the graph 102 in FIG. 5A. Accordingly, the area surrounded by the graph 103, the X axis, and the Y axis within the range from the start of speed reduction (time point ta) to when the motor rotation speed reaches the reference speed Vc1 (time point t31) is smaller than the area surrounded by the graph 102, the X axis, and the Y axis within the range from the start of speed reduction (time point ta) to when the motor rotation speed reaches the reference speed Vc1 (time point t3). Therefore, in the control shown by the graph 103, the period for powering (the time points t31 to t41) is lengthened so as to compensate the motor rotation amount equivalent to the deficiency in area.

As a result, the time point t41, at which the pulse count Pc reaches the reference value Ps, is delayed as compared to the time point t4 in FIG. 5A. This causes the stopping time to be lengthened.

On the other hand, in the speed reduction control shown by a graph 104, the threshold value −Sa, which is a negative threshold value, is set to be too large. In this case, the motor rotation amount (area) from the start of speed reduction to when the motor rotation speed reaches the reference speed Vc1 (time point t51) is larger than in the case of the speed reduction control shown by the graph 101 in which the motor rotation speed is reduced at the reference speed reduction rate Gs. In the speed reduction control shown by the graph 104, the pulse count Pc is likely to exceed the reference value Ps at the time point t51. If the pulse count Pc exceeds the reference value Ps, the stopping distance is lengthened by the amount equivalent to the excess, as compared to the original speed reduction control in which the last brake is applied when the pulse count Pc reaches the reference value Ps.

Based on the above, it is preferable to set the threshold values (−Sa and Sb) to be relatively small. However, the smaller the threshold values, the shorter the cycle of repeating braking and powering. This is likely to cause a failure in switching between applying a short brake and supplying current to the transport motor 63. Accordingly, it is not realistic to set the threshold values (−Sa and Sb) to be too small.

In view of the above, speed reduction according to the reference speed reduction rate Gs can be realized by setting the threshold values (−Sa and Sb) small within a range that allows for switching between supplying current to the transport motor 63 and applying the short brake.

In a case where the last brake is applied when the pulse count Pc reaches the reference value Ps, the difference 6 between the reference motor rotation amount and the current motor rotation amount during the time period from the start of the last brake to the stop of the transport motor 63 results in variations in the stopping distance, as described above. In order to suppress variations, the difference 6 may be minimized.

Figure 7:
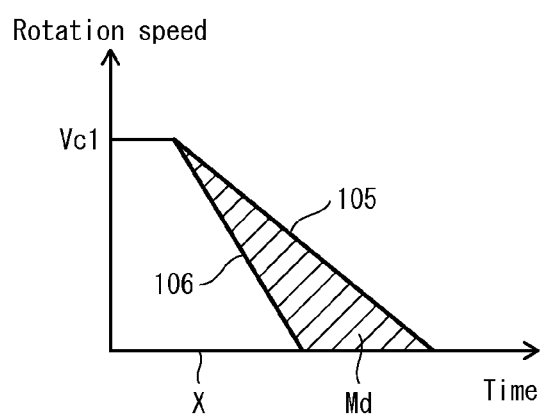
FIG. 7 shows changes in the motor rotation speed from when the motor rotation speed reaches a reference speed and the application of a last brake is started, to when a motor is stopped.

FIG. 7 shows changes in the motor rotation speed from the start of the last brake, at which the motor rotation speed is the reference speed Vc1, to the stop of the transport motor 63. During this time period, the last brake is continuously applied. The changes are indicated by two graphs, i.e., a graph 105 in a case where the motor drive load is assumed to be at minimum, and a graph 106 in a case where the motor drive load is assumed to be at maximum. The inclination of each of the graphs 105 and 106 corresponds to a speed reduction rate, and the graphs 105 and 106 are linear.

This is because when the last brake is applied to stop the transport motor 63 while the motor rotation speed is approximately 1000 min$^{-1}$ or lower, the speed reduction rate is most likely linear regardless of the amount of the motor drive load.

An area Md (hatched area) surrounded by the graphs 105 and 106, and the X axis corresponds to a maximum value $\delta_{max}$, which is a difference $\delta$ between motor rotation amounts, and the maximum value $\delta_{max}$ is the maximum value of variations in the stopping distance. In order to suppress variations, the maximum value $\delta_{max}$ may be decreased, and, in order to decrease the maximum value $\delta_{max}$, the area Md may be decreased.

The area Md may be decreased by setting the reference speed Vc1 at which the application of the last brake is started to be as low as possible, provided that the speed reduction rate under the minimum load (inclination of the graph 105) and the speed reduction rate under the maximum load (inclination of the graph 106) in FIG. 7 are constant.

However, if the reference speed Vc1 is too low, this will cause variations in the stopping time due to the feedback control performed in the low-speed period shown in the comparative example. On the other hand, if the reference speed Vc1 is too high, the area Md becomes large, causing an increase in the maximum value $\delta_{max}$ of variations in the stopping distance.

Accordingly, the reference speed Vc1 may be determined so as to satisfy the following conditions: the reference speed Vc1 falls within the high-speed period rather than the low-speed period in which variations in the stopping distance occur due to the feedback control; and the maximum value $\delta_{max}$ of variations falls within a target range. In this way, variations in the stopping distance caused by variations in the drive load of the transport motor 63 can be suppressed.

In this respect, it can be said that the reference speed Vc1 is a speed that satisfies the following condition. That is, when the brake is continuously applied to stop the transport motor 63 under a first condition that the stopping distance becomes the longest (e.g., minimum load) and under a second condition that the stopping distance becomes the shortest (e.g., maximum load), then the reference speed Vc1 allows the difference between the stopping distance under the first condition and the stopping distance under the second condition to be smaller than or equal to a predetermined value.

In the present embodiment, the reference speed Vc1 is set to 800 min$^{-1}$, so that the variations due to the feedback control in the low-speed period do not affect the stopping distance and the stopping time. Also, the threshold values (−Sa and Sb) are set through experiments, etc., in a manner that variations in the stopping distance and variations in the stopping time fall within respective target ranges.

Note that the graph 102 in FIG. 5A shows an example in which braking and powering are alternately repeated twice before the application of the last brake. However, braking and powering may be repeated once or more than twice depending on the magnitudes of the motor rotation speed, the stopping distance, the stopping time, and the threshold values (−Sa and Sb).

[5] Flow of Speed Reduction Control

Figure 8:
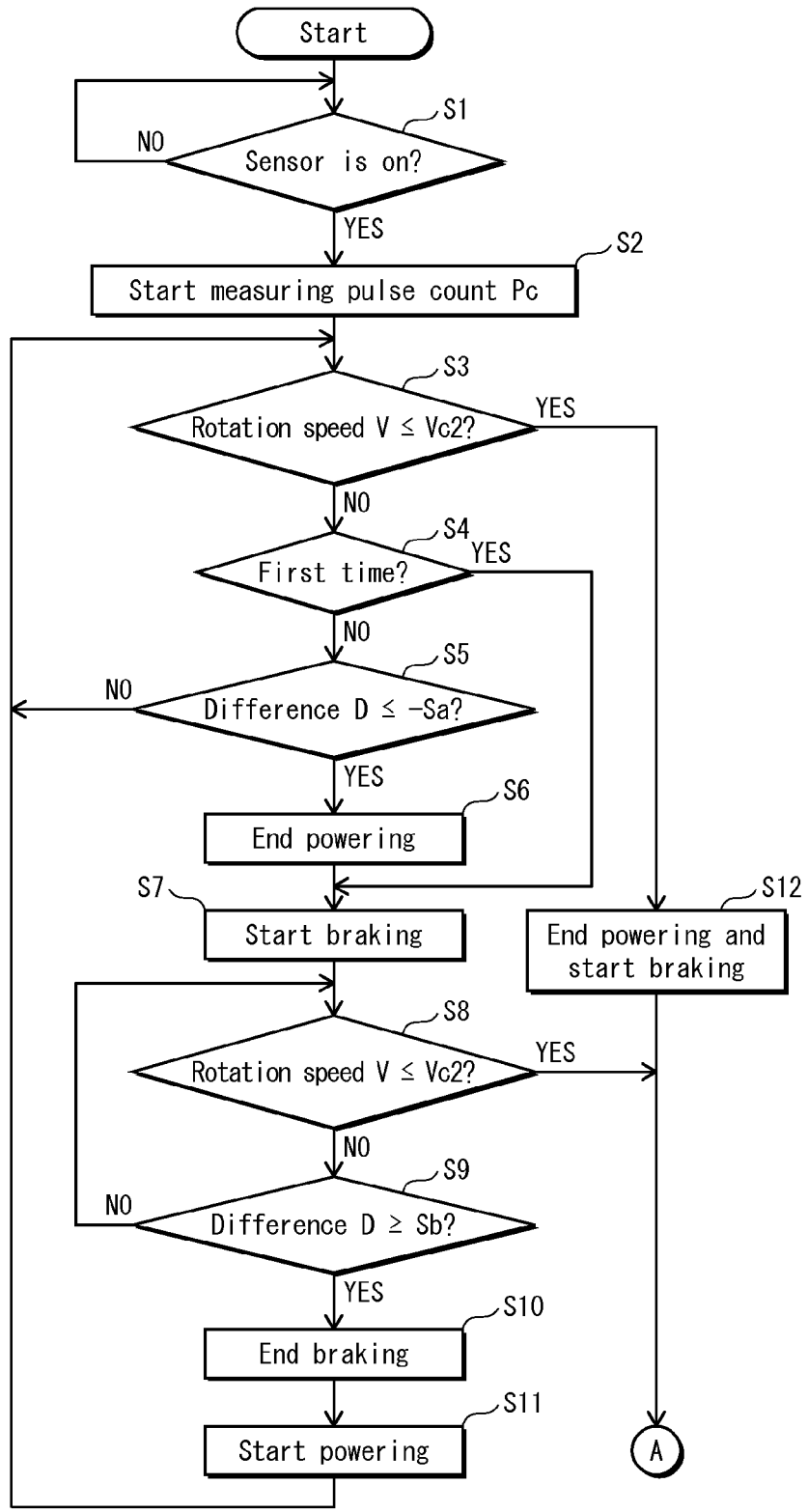
FIG. 8 is a part of a flowchart showing a speed reduction control.
Figure 9:
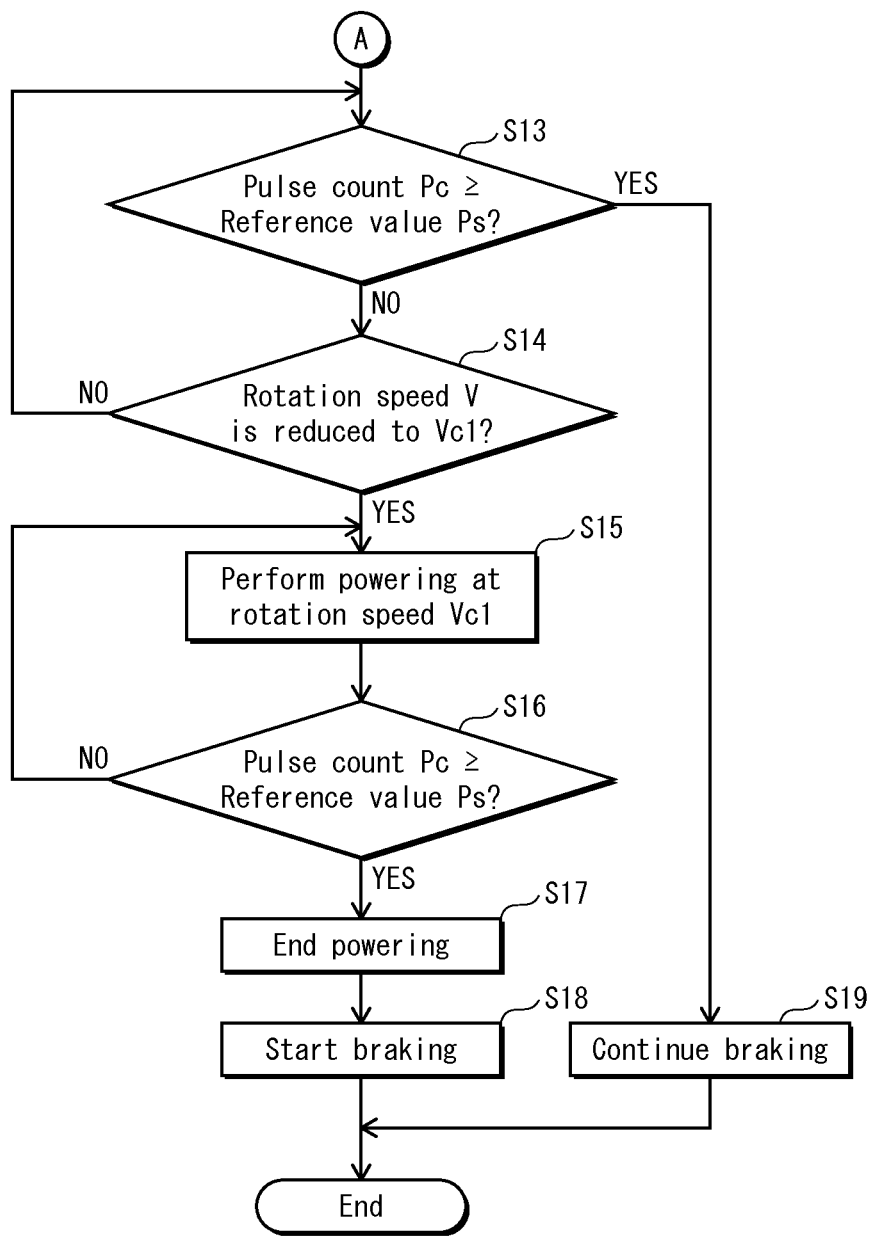
FIG. 9 is the remaining part of the flowchart showing the speed reduction control.

FIGS. 8 and 9 are flowcharts showing the speed reduction control during the registration operation performed on a sheet S fed from the paper feed cassette 31b. The speed reduction control is performed by the CPU 601 in the motor control unit 60.

As shown in FIG. 8, when a leading edge of a sheet S that is being transported is detected by the registration sensor 38 ("YES" in step S1), the CPU 601 starts counting the number of pulses of the pulse signal output from the encoder 633 of the transport motor 63 to obtain the pulse count Pc (step S2). The timing at which the measuring of the pulse count Pc is started corresponds to the time point to in FIG. 5A.

Next, the CPU 601 determines whether a current motor rotation speed V is lower than or equal to a rotation speed Vc2, which is a predetermined value (step S3). The current motor rotation speed V is calculated based on the number of pulses per unit time. The rotation speed Vc2 as a threshold value is determined in advance so as to be higher than the reference speed Vc1. In the present example, the rotation speed Vc2 is set to 900 min$^{-1}$. The reason for setting the rotation speed Vc2 is described later.

At the start of speed reduction, the motor rotation speed V is the rotation speed Vct which corresponds to the system speed (=2000 min$^{-1}$), and the motor rotation speed V immediately after the speed reduction is larger than the rotation speed Vc2. Accordingly, the CPU 601 determines that the relationship of the motor rotation speed V≤Vc2 is not satisfied ("NO" in step S3), and proceeds to step S4.

In step S4, the CPU 601 determines whether the determination in step S3 has been performed for the first time since the start of speed reduction. This determination in step S4 is performed as follows, for example. Every time the CPU 601 performs the determination of step S3, the CPU 601 determines whether a predetermined flag is set or not. If the flag is not set, the CPU 601 sets the flag. If the flag is set, the CPU 601 leaves the flag as is. Then, during step S4, the CPU 601 determines that the determination of step S3 has been performed for the first time if the flag is not set, and determines that the determination of step S3 has been performed more than once if the flag is set.

When determining that the determination of step S3 has been performed for the first time ("YES" in step S4), the CPU 601 applies a brake (step S7). The start of this braking corresponds to a time point immediately after the time point to in FIG. 5A.

With this braking, the motor rotation speed is rapidly reduced. Note that the speed reduction rate of the motor rotation speed when the brake is applied varies depending on the amount of the drive load of the transport motor 63.

Subsequently, the CPU 601 determines once again whether the current motor rotation speed V is lower than or equal to the rotation speed Vc2 (step S8). When determining negatively ("NO" in step S8), the CPU 601 determines whether a difference D is larger than or equal to a threshold value Sb (step S9).

Note here that the difference D and the threshold value Sb are equal to the difference D and the threshold value Sb in FIG. 5A, respectively. The difference D is a value obtained by subtracting the current motor rotation speed V from the reference rotation speed.

As described above, the reference rotation speed is the motor rotation speed on the presumption that the motor rotation speed is reduced at the reference speed reduction rate Gs under the minimum load. The reference rotation speed is read from a reference rotation speed table 111 stored in the storage unit 602.

FIG. 10 shows an example of the structure of the reference rotation speed table 111.

As shown in FIG. 10, the reference rotation speed table 111 shows the time elapsed since the start of speed reduction in association with the reference rotation speed. For example, if the elapsed time is t1, the reference rotation speed is V1, and if the elapsed time is t2, the reference rotation speed is V2.

Returning to FIG. 8, when the CPU 601 determines that the difference D is not larger than or equal to the threshold value Sb ("NO" in step S9), the CPU 601 returns to step S8. When the CPU 601 determines that the current motor rotation speed V is not lower than or equal to the rotation speed Vc2 in step S8, the CPU 601 determines once again whether the difference D is larger than or equal to the threshold value Sb (step S9).

During the time period from the start of speed reduction to when the current motor rotation speed V is reduced to the rotation speed Vc2, which is 900 min$^{-1}$, the CPU 601 repeatedly performs steps S8 and S9 until the relationship of the difference D≥Sb is satisfied. The time period in which the CPU 601 repeatedly performs steps S8 and S9 corresponds to the time period between the time points to and t1 in FIG. 5A.

When determining that the relationship of the difference D≥Sb is satisfied ("YES" in step S9), the CPU 601 ends braking (step S10), starts powering (step S11), and returns to step S3. The start of this powering corresponds to the time point t1 in FIG. 5A. This switching from braking to powering causes a decrease in the difference D.

When the CPU 601 determines that the relationship of the current motor rotation speed V≤the rotation speed Vc2 is not satisfied in step S3, the CPU 601 proceeds to step S4. When determining that the determination of step S3 has been performed more than once ("NO" in step S4), the CPU 601 determines whether the relationship of the difference D≤the threshold value −Sa is satisfied (step S5). Note here that the threshold value −Sa is equal to the threshold value −Sa in FIG. 5A.

When determining that the relationship of the difference D≤−Sa is not satisfied ("NO" in step S5), the CPU 601 returns to step S3. When the CPU 601 determines that the relationship of the current motor rotation speed V≤the rotation speed Vc2 is not satisfied in step S3, and determines that the determination of step S3 has been performed more than once in step S4, then the CPU 601 determines once again whether the relationship of the difference D≤−Sa is satisfied (step S5).

During the time period from the start of speed reduction to when the current motor rotation speed V is reduced to the rotation speed Vc2, the CPU 601 repeatedly performs steps S3, S4, and S5 until the relationship of the difference D≤−Sa is satisfied. The time period in which the CPU 601 repeatedly performs steps S3, S4, and S5 corresponds to the time period between the time points t1 and t2 in FIG. 5A.

When determining that the relationship of the difference D≤−Sa is satisfied ("YES" in step S5), the CPU 601 ends powering (step S6), starts braking (step S7), and proceeds to step S8. The start of this braking corresponds to the time point t2 in FIG. 5A. This switching from powering to braking causes another sharp decrease in the motor rotation speed.

During the time period in which steps S8 and S9 are repeatedly performed, when the relationship of the current motor rotation speed V≤the rotation speed Vc2 is satisfied ("YES" in step S8) before the relationship of the difference D≥Sb is satisfied, the CPU 601 proceeds to step S13 in FIG. 9. The timing at which the relationship of the current motor rotation speed V≤Vc2 is satisfied corresponds to a time point tj in FIG. 5A.

Also, during the time period in which steps S3 to S5 are repeatedly performed, when the relationship of the current motor rotation speed V≤the rotation speed Vc2 is satisfied ("YES" in step S3) before the relationship of the difference D≤−Sa is satisfied, then this means that powering is being performed. Accordingly, the CPU 601 ends the powering in step S12, starts braking, and proceeds to step S13.

In step S13 in FIG. 9, the CPU 601 determines whether the pulse count Pc measured from the start of speed reduction has reached the reference value Ps, i.e., whether the relationship of Pc≥Ps is satisfied.

When determining that the relationship of the pulse count Pc≥the reference value Ps is not satisfied ("NO" in step S13), the CPU 601 determines whether the motor rotation speed V has been reduced to the reference speed Vc1 (step S14). When determining that the motor rotation speed V has not yet been reduced to the reference speed Vc1 ("NO" in step S14), the CPU 601 returns to step S13.

When determining that the relationship of the pulse count Pc≥the reference value Ps is not satisfied ("NO" in step S13), the CPU 601 once again determines whether the motor rotation speed V has been reduced to the reference speed Vc1 (step S14). When determining that the motor rotation speed V has not yet been reduced to the reference speed Vc1 ("NO" in step S14), the CPU 601 returns to step S13.

When determining that the motor rotation speed V has been reduced to the reference speed Vc1, before the relationship of the pulse count Pc≥the reference value Ps is satisfied ("YES" in step S14), the CPU 601 starts powering so that the motor rotation speed V is maintained at the reference speed Vc1 (step S15). The start of this powering corresponds to the time point t3 in FIG. 5A. The powering is performed by the feedback control with the reference speed Vc1 being set as a target speed.

During the powering, the CPU 601 determines once again whether the relationship of the pulse count Pc≥the reference value Ps is satisfied (step S16). When determining negatively ("NO" in step S16), the CPU 601 returns to step S15.

The CPU 601 repeatedly performs steps S15 and S16 until the relationship of the pulse count Pc≥the reference value Ps is satisfied. The time period in which the CPU 601 repeatedly performs steps S15 and S16 corresponds to the time period between the time points t3 and t4 in FIG. 5A.

When determining that the relationship of the pulse count Pc≥the reference value Ps is satisfied ("YES" in step S16), the CPU 601 ends powering (step S17), starts the last braking and continues the last braking until the transport motor 63 stops (step S18), and ends the speed reduction control.

Note that the last braking further continues during the time period from when the sheet S is temporarily stopped upon completion of the speed reduction control to when the transport of the sheet S is resumed (see the time point tc in FIG. 2). The last braking is released when the transport of the sheet S is resumed.

In the speed reduction control described above, when the CPU 601 determines that the motor rotation speed V has been reduced to the reference speed Vc1 ("YES" in step S14), the CPU 601 starts powering (step S15). However, instead of these steps, the CPU 601 may perform the following steps, for example. That is, after the CPU 601 determines that the motor rotation speed V has been reduced to the reference speed Vc1 in step S14, the CPU 601 may further determine whether the relationship of the pulse count Pc≥the reference value Ps is satisfied. When determining negatively, the CPU 601 may perform powering (step S15). When determining affirmatively, the CPU 601 may skip powering (not performing powering), and may continuously apply the last brake until the transport motor 63 stops (step S18).

On the other hand, when the CPU 601 determines that the relationship of the pulse count Pc≥the reference value Ps is satisfied ("YES" in step S13), before the motor rotation speed V is reduced to the reference speed Vc1 ("NO" in step S14), then the CPU 601 continuously applies the currently-applied brake as the last brake (step S19), and ends the speed reduction control. It can be said that step S19 is a control of forcibly aborting the ongoing feedback control of steps S2 to S17 and starting the application of the last brake.

This control is performed to further suppress variations in the stopping distance.

In other words, the speed reduction control of the present embodiment is basically performed in a manner that the last brake is applied after the motor rotation speed V is reduced to the reference speed Vc1 and the relationship of the pulse count Pc≥the reference value Ps is satisfied (basic control). In this way, variations in the stopping distance fall within the range of the area Md in FIG. 7 (maximum value $\delta_{max}$ of variations).

It is desirable that the basic control be performed on each of the sheets S; however, when a speed reduction control is performed on a certain sheet S, the relationship of the pulse count Pc≥the reference value Ps may be satisfied before the motor rotation speed V is reduced to the reference speed Vc1.

In such a case, unless the rotation speed Vc2 is set, the CPU 601 waits until the motor rotation speed V is reduced to the reference speed Vc1, and thereafter determines whether the relationship of the pulse count Pc≥the reference value Ps is satisfied, and, when determining affirmatively, the CPU 601 applies the last brake. As a result, the stopping distance is lengthened by the motor rotation amount during the waiting period.

Accordingly, a speed that is lower than the predetermined motor rotation speed Vct which corresponds to the transport speed (system speed), and that is slightly higher than the reference speed Vc1 may be set as the rotation speed Vc2. If the relationship of the pulse count Pc≥the reference value Ps is satisfied at the time when the motor rotation speed V is reduced to the rotation speed Vc2, the CPU 601 stops (refrains from) waiting for the motor rotation speed V to be reduced to the reference speed Vc1, and switches to a control (exceptional control) of continuously applying the brake until the transfer motor 63 stops. In this way, variations in the stopping distance can be suppressed as compared to the control in which the CPU 601 waits until the motor rotation speed V is reduced to the reference speed Vc1.

As described above, the rotation speed Vc2 is set to be higher than the reference speed Vc1. However, if the rotation speed Vc2 is set to be too high, the relationship of the pulse count Pc≥the reference value Ps will be rarely satisfied at the point of determination. Conversely, if the rotation speed Vc2 is set to be too low, the aforementioned exceptional control does not differ significantly from the control that includes the step of waiting until the motor rotation speed V is reduced to the reference speed Vc1. Accordingly, it is preferable that the rotation speed Vc2 be appropriately determined through experiments or the like, based on the target range for variations in the stopping distance.

In the above example, the speed reduction control is performed in the order of braking, powering, and braking. However, if the number of times braking and powering are performed differs from the above example, the number of times switching is performed from powering to braking in steps S3 to S7 and the number of times switching is performed from braking to powering in steps S8 to S11 also differ from the above example. Even if the number of switching operations is changed, this feedback control is the same as the feedback control described in the above example in that the control is performed in manner that the motor rotation speed is reduced according to the reference speed reduction rate Gs.

Also, in the flowchart of FIG. 8, when the relationship of the current motor rotation speed V≤the rotation speed Vc2 is satisfied ("YES" in step S3), switching is performed from powering to braking (step S12), and the processing proceeds to step S13. However, it is not limited to such.

For example, when determining affirmatively in step 3, the CPU 601 may skip braking in step S12 and proceed to step S13 to determine whether the relationship of the pulse count Pc≥the reference value Ps is satisfied. When determining negatively in step S13, the CPU 601 may start braking. With this structure, if the determination in step S3 is affirmative, there is a possibility that the determination in step 13 is affirmative and the process proceeds to step S19. In such a case, the CPU 601 may switch from powering to the last brake in step S19.

As described above, according to Embodiment 1, the speed reduction control is performed by: reducing speed by the feedback control in which braking and powering are alternately repeated from the start of speed reduction until the motor rotation speed V is reduced to the reference speed Vc1; maintaining the reference speed Vc1 by powering until the pulse count (motor rotation amount) Pc reaches the reference value Ps; and thereafter simply applying the last brake without performing any other operations until the motor stops.

The reference speed Vc1, which is the minimum allowable speed for performing the feedback control, is set to be higher than a speed in the low-speed period in which variations in the stopping distance and the stopping time are assumed to occur, and the feedback control is prohibited in the low-speed period during which the motor rotation speed is lower than the reference speed Vc1. This suppresses variations in the stopping distance, and also suppresses variations in the stopping time caused by the feedback control performed in the low-speed period.

Also, the threshold values (−Sa and Sb) used in the feedback control performed until the motor rotation speed V is reduced to the reference speed Vc1, and the reference value Ps which is the rotation amount from the start of speed reduction and used as a condition for starting the last brake are appropriately set in advance. In this way, variations in the stopping distance and variations in the stopping time fall within the respective target ranges.

The reference value Ps may be the pulse count Pc from the start of speed reduction (time point to in FIG. 5A, etc) to the time point th (see FIG. 5A) at which when the brake is continuously applied from the start of speed reduction, the motor rotation speed reaches the reference speed Vc1 under the condition that the stopping distance becomes the longest (e.g., minimum load). Alternatively, the reference value Ps is set to be larger than the pulse count PC at the time point th.

Since variations in the stopping distance are suppressed, the loop Lp having an appropriate size can be formed in a sheet S in the registration operation.

Also, since variations in the stopping time are suppressed, the transport of the sheet S after the formation of the loop Lp can be resumed at an appropriate timing for image formation.

If variations in the stopping time are large as seen in the conventional speed reduction control, the stopping time may be lengthened unexpectedly. In such a case, the resumption of the transport of the sheet S may not coincide with the timing for image formation. Also, if the timing for image formation is delayed in anticipation of a delay in the resumption of the transport of the sheet S, the productivity of printing will be lowered. In the speed reduction control according to the present embodiment, however, such problems do not occur.

In the above, the description is provided of an example of the speed reduction control performed during the registration operation for forming the loop Lp in a sheet S fed from the paper feed cassette 31b. However, the same a speed reduction control is performed when the registration operation is performed to form the loop Lp in a sheet S fed from the paper feed cassette 31a. In this case, the speed reduction control is performed on the transport motor 62a.

[6] Modification of Embodiment 1

According to Embodiment 1 above, switching is performed between braking and powering with use of the difference D between the motor rotation speed and the reference rotation speed, during the time period from the start of speed reduction to the time point at which the motor rotation speed is reduced to the reference speed Vc1. The present modification differs from Embodiment 1 in that the switching between braking and powering is performed with use of the pulse count instead of the motor rotation speed. Hereinafter, descriptions that are the same as in Embodiment 1 are omitted to avoid repetition, and the same reference signs are given to components that are the same as in Embodiment 1.

Figure 11:
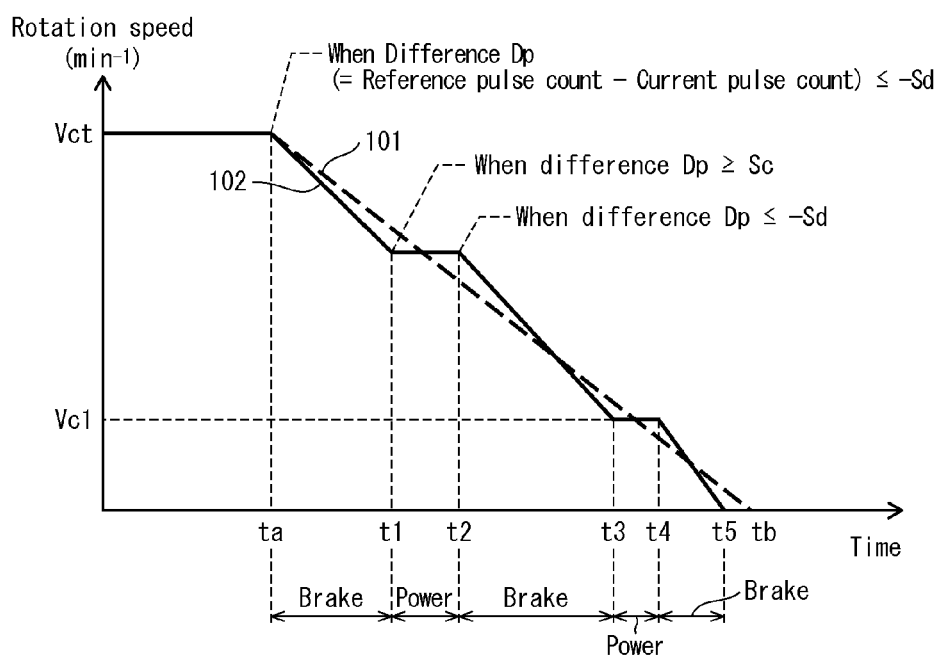
FIG. 11 is a timing chart showing a speed reduction control according to a modification.

FIG. 11 is a timing chart showing the speed reduction control according to the present modification.

As shown in FIG. 11, according to the present modification, switching from braking to powering is performed when a difference Dp, which is a value obtained by subtracting the current pulse count Pc from a reference pulse count, is larger than or equal to a positive threshold value Sc. Also, switching from powering to braking is performed when the difference Dp is smaller than or equal to a negative threshold value −Sd.

The reference pulse count refers to a cumulative pulse count (motor rotation amount) from the start of speed reduction, on the presumption that the motor rotation speed is reduced at a reference speed reduction rate Gp corresponding to the inclination of the graph 101 indicating changes in the motor rotation speed under the minimum load.

FIG. 12 shows an example of the structure of a reference pulse count table 121 showing the time elapsed since the start of speed reduction in association with the reference pulse count.

For example, it can be known from the reference pulse count table 121 that if the elapsed time is t1, the reference pulse count is P1, and that if the elapsed time is t2, the reference pulse count is P2. The reference pulse count is calculated through experiments or the like, and is written in advance in the reference pulse count table 121 stored in the storage unit 602.

For each predetermined time interval from the start of speed reduction, a difference between the reference pulse count (reference rotation amount) corresponding to the time point at which the predetermined time interval has elapsed and the pulse count Pc (motor rotation amount) detected at the time point at which the predetermined time interval has elapsed is calculated as the difference Dp.

Figure 13:
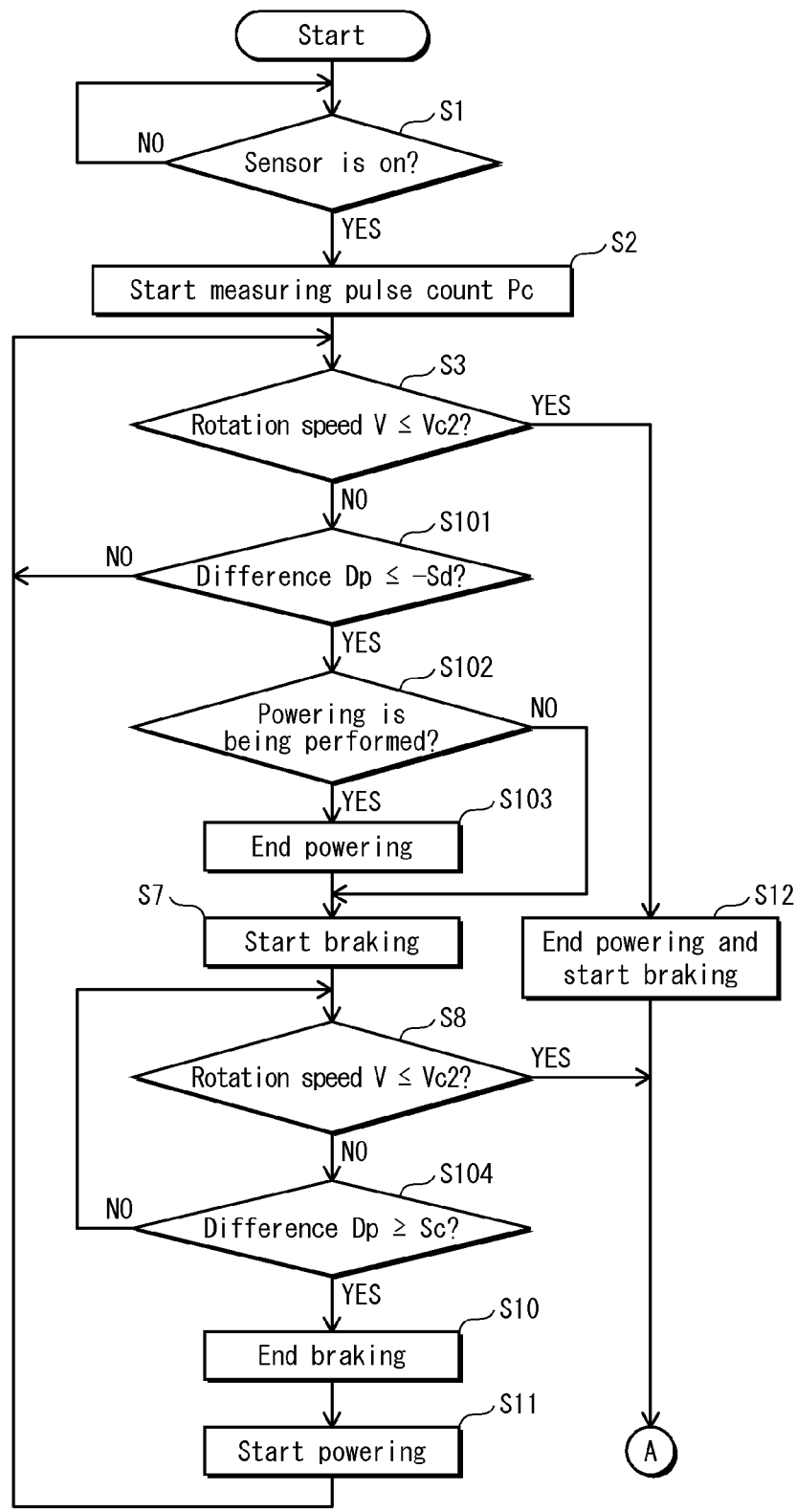
FIG. 13 is a flowchart showing a part of the speed reduction control according to the modification.

FIG. 13 is a flowchart showing a part of the speed reduction control according to the present modification. The flowchart in FIG. 13 is a partial modification of the flowchart shown in FIG. 8 according to Embodiment 1.

Specifically, FIG. 13 includes steps S101 to S103 instead of steps S4 to
S6 in FIG. 8, and includes step S104 instead of step S9 in FIG. 8.

As shown in FIG. 13, the CPU 601 starts measuring the pulse count Pc (step S2). When the relationship of the motor rotation speed V≤Vc2 is not satisfied ("NO" in step S3), the CPU 601 determines whether the relationship of the difference Dp≤−Sd is satisfied (step S101). According to Embodiment 1, the CPU 601 performs step S4 to determine whether the determination of step S3 has been performed for the first time. In the present modification, however, this determination in step S4 is not performed.

This is because of the following reason.

Embodiment 1 employs the structure of detecting the motor rotation speed. Accordingly, if a detection error occurs, the relationship of the difference D≤−Sa may not be satisfied at the start of speed reduction. In this case, the brake may not be applied when the speed reduction is supposed to start. In order to stop such a situation, the brake is forcibly applied if it is determined that the determination of step S3 (i.e., determination as to whether V≤Vc2) has been performed for the first time ("YES" in step S4 of FIG. 8; step S7 in FIG. 8).

On the other hand, the present modification employs the detected pulse count per se. This means that at the start of speed reduction, the pulse count and the reference pulse count are both zero. As a result, the relationship of the difference Dp≤−Sd is satisfied, and the risk of the brake not being applied does not need to be considered. If need arises, it is possible to perform the determination as to whether the relationship of the motor rotation speed V≤Vc2 has been performed for the first time.

When determining that the relationship of the difference Dp≤−Sd is satisfied ("YES" in step S101), the CPU 601 determines whether powering is currently being performed (step S102). When determining negatively ("NO" in step S102), the CPU 601 starts braking (step S7). In this way, the brake is applied to start speed reduction. The start of this braking corresponds to the time point to in FIG. 11.

After the start of braking, the CPU 601 determines whether the relationship of the difference Dp≥Sc is satisfied in step S104. If the relationship of the difference Dp≥Sc is not satisfied, the CPU 601 repeatedly performs steps S8 and S 104.

When determining that the difference Dp≥Sc is satisfied ("YES" in step S 104), the CPU 601 ends braking (step S10), starts powering (step S11), and returns to step S3. The start of this powering corresponds to the time point t1 in FIG. 11.

When determining that the relationship of the difference Dp≤−Sd is satisfied after the start of powering ("YES" in step S101), the CPU 601 ends the powering currently being performed ("YES" in step S102; S 103), and starts braking (step S7). Thereafter, braking and powering are repeatedly performed until the relationship of the motor rotation speed V≤Vc2 is satisfied (step S3 or step S8).

As described above, the feedback control in which switching is performed between braking and powering can be performed with use of the pulse count. Note that the threshold values (Sc and −Sd) are determiners for the stopping time and the stopping distance, similarly to the threshold values (−Sa and Sb) in Embodiment 1. Accordingly, these values Sc and −Sd are appropriately calculated through experiments or the like, and stored in the storage unit 602 in advance.

According to the above description, determination on switching from braking to powering and determination on switching from powering to braking are both performed with use of the difference Dp between the pulse count and the reference pulse count. However, no limitation is intended thereby. For example, one of these determination steps may be performed with use of the difference D between the motor rotation speed and the reference rotation speed according to Embodiment 1.

Figure 14:
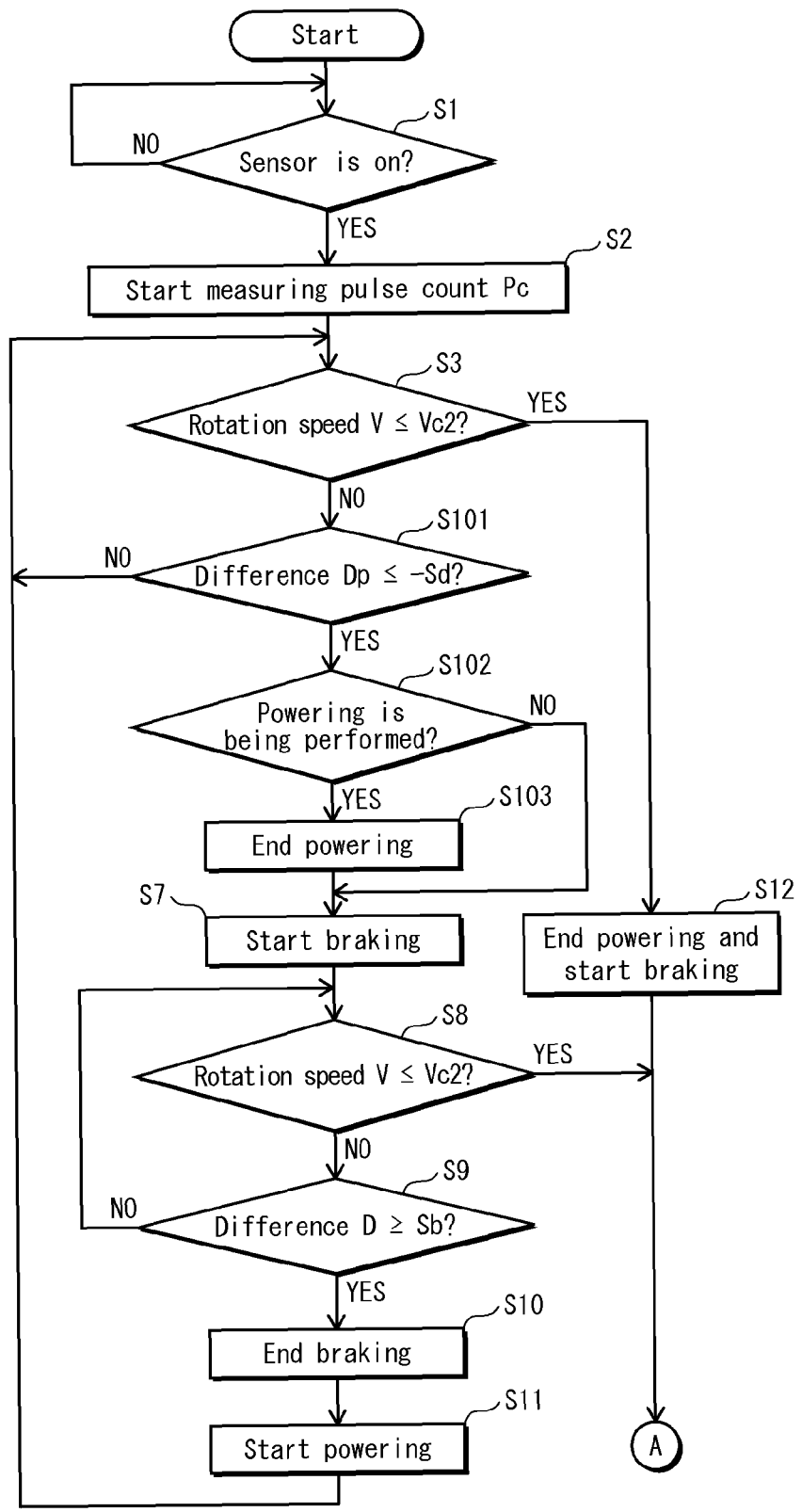
FIG. 14 is a flowchart showing a part of a different speed reduction control according to the modification.

FIG. 14 is a flowchart showing an example of performing determination on switching from braking to powering, with use of the difference D between the motor rotation speed and the reference rotation speed (step S9), and performing determination on switching from powering to braking, with use of the difference Dp between the pulse count and the reference pulse count (step S101).

Figure 15:
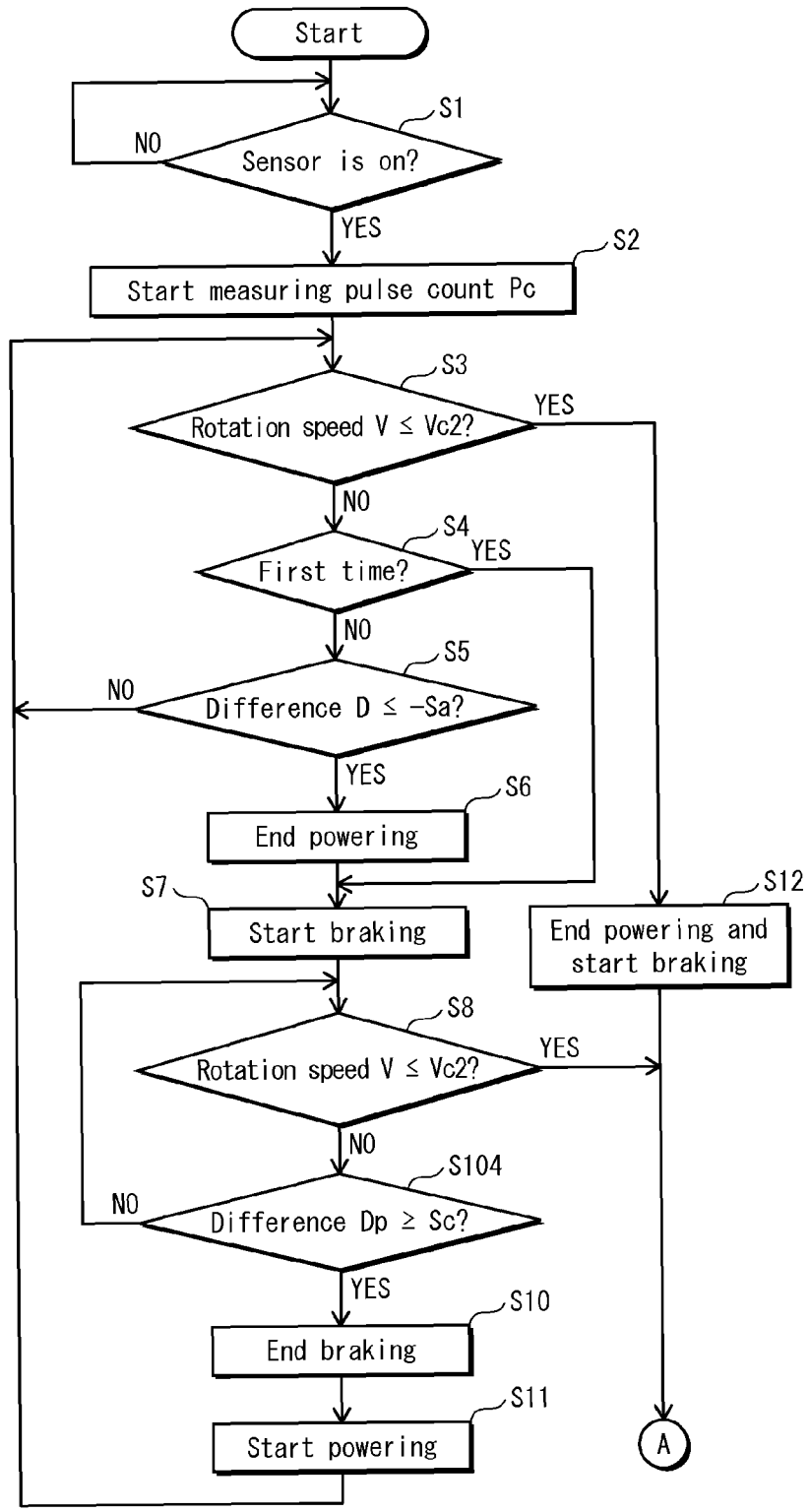
FIG. 15 is a flowchart showing a part of yet another speed reduction control according to the modification.

Also, FIG. 15 is a flowchart showing an example of performing determination on switching from braking to powering, with use of the difference Dp between the pulse count and the reference pulse count (step S104), and performing determination on switching from powering to braking, with use of the difference D between the motor rotation speed and the reference rotation speed (step S5).

As described above, determination on switching between braking and powering can be performed with use of the differences D and Dp, and whether to use the difference D or Dp for each switching step can be appropriately selected depending on the structure of the image processing apparatus. This enhances flexibility in design.

EMBODIMENT 2

The above Embodiment 1 describes the feedback control in which switching is performed between braking and powering for the time period from the start of speed reduction to when the motor rotation speed is reduced to the reference speed Vc1. Embodiment 2 differs from Embodiment 1 in that, instead of the feedback control, free running and braking are performed in the stated order.

The free running refers to a state in which the rotational shaft 635 that is in a rotating state keeps rotating through inertia (coasting) due to interruption of current to the coils 634 of the transport motor 63.

[1] Timing Chart Showing Speed Reduction Control

Figure 16A:
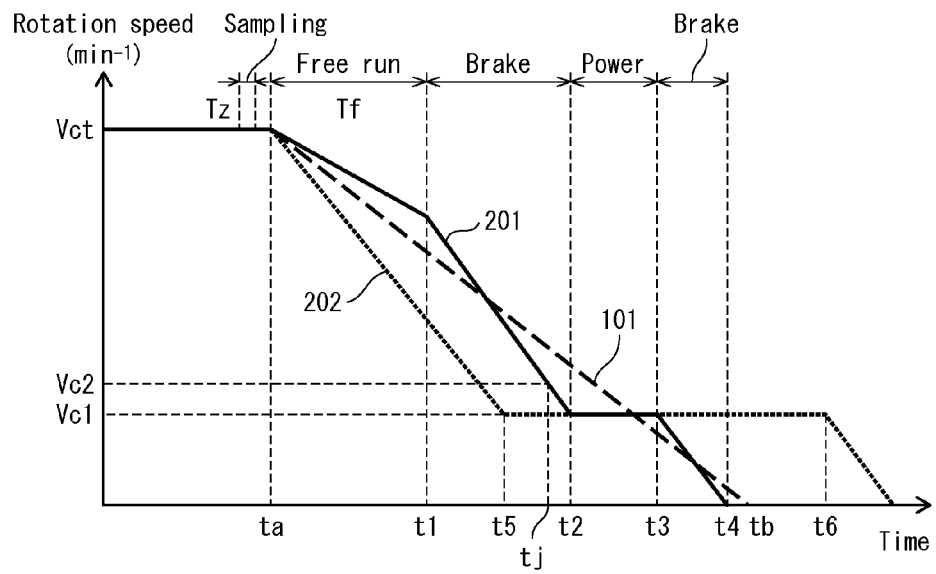
FIGS. 16A to 16C show details of a speed reduction control according to Embodiment 2.
Figure 16B:
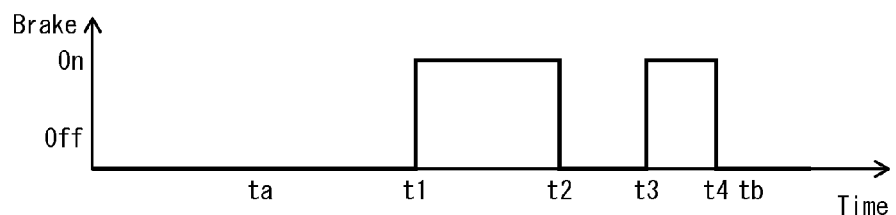
Figure 16C:
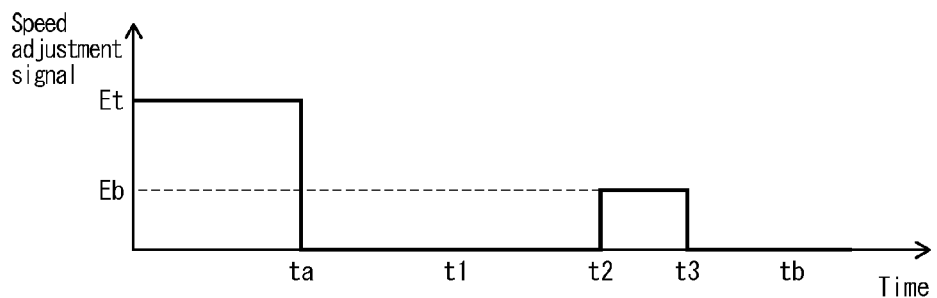

FIGS. 16A to 16C each show a timing chart showing details of a speed reduction control according to Embodiment 2. Specifically, FIG. 16A shows changes in the motor rotation speed, FIG. 16B shows the timing of switching the brake signal between on and off, and FIG. 16C shows changes in the voltage value of the speed adjustment signal.

In FIG. 16A, a graph 101 shows changes in the motor rotation speed when the motor drive load is at minimum, and a graph 201 shows changes in the motor rotation speed when the motor drive load is larger than the minimum load.

In the graph 201, free running is performed from the start of speed reduction (time point ta) to a time point t1, braking is performed from the time point t1 to a time point t2, powering is performed from the time point t2 to a time point t3, and last braking is performed from the time point 3 to a time point t4.

Embodiment 2 is the same as Embodiment 1 in that: when the motor rotation speed is reduced to the reference speed Vc1 (time point t2), powering is performed so that the motor rotation speed is maintained at the reference speed Vc1; and when the pulse count Pc reaches the reference value Ps during the powering, application of the last brake is started.

Accordingly, similarly to Embodiment 1, the stopping distance and the stopping time fall within the respective target ranges by reducing the motor rotation speed in a manner that the time point t2 at which the motor rotation speed is reduced to the reference speed Vc1 immediately precedes the time point at which the pulse count Pc reaches the reference value Ps.

According to Embodiment 2, the motor rotation speed is not reduced by the feedback control. Instead, the motor rotation speed is reduced by free running at the start of speed reduction and by braking after the free running.

Figure 17A:
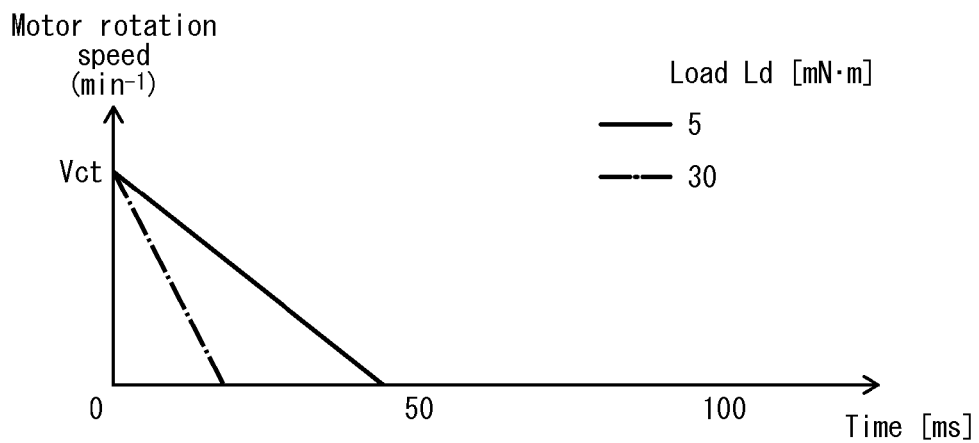
FIG. 17A shows brake stop characteristics associated with variations in a motor drive load.

[2] Brake Stop Characteristics and Free Run Stop Characteristics Associated with Variations in Motor Drive Load FIG. 17A shows brake stop characteristics associated with variations in the motor drive load. Graphs in FIG. 17A show that the stopping time is varied by the motor drive load, when a brake is continuously applied for the time period from when the motor rotation speed is Vct (=2000 min$^{-1}$) to when the transport motor 63 is stopped.

Figure 17B:
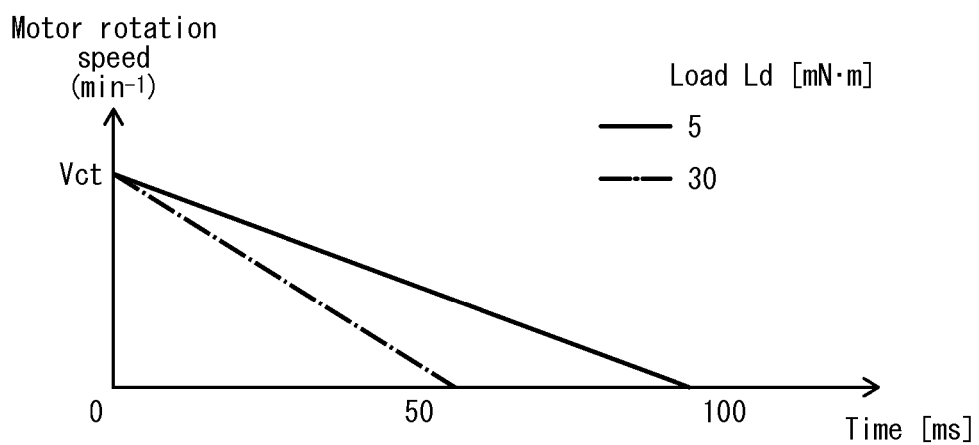
FIG. 17B shows free-run stop characteristics associated with variations in the motor drive load.

FIG. 17B shows free-run stop characteristics associated with variations in the motor drive load. Graphs in FIG. 17B show that the stopping time is varied by the motor drive load, when a free run is continued for the time period from when the motor rotation speed is Vct to when the transport motor 63 is stopped.

In each of FIGS. 17A and 17B, a graph in a solid line indicates a case where the motor drive load Ld is at minimum, which is 5 mN·m in the present example, and a graph in an alternating long and short dashed line indicates a case where the motor drive load Ld is at maximum, which is 30 mN·m in the present example.

When the brake stop characteristics in FIG. 17A are compared to the free-run stop characteristics in FIG. 17B, it can be known that the stopping time in the case of free running is approximately twice as long as the stopping time in the case of braking. This is because of the following reason. During braking, the motor rotation speed is forcibly reduced by causing both ends of each coil 634 in the transport motor 63 to electrically short out, whereas during free running, the rotational shaft 635 keeps rotating through inertia by interruption of current to the transport motor 63. As a result, the speed reduction rate in the case of free running becomes small as compared to the case of braking.

Suppose that the motor drive load Ld is at minimum, for example, 5 mN, and that the time period in which free running is performed (i.e., free running time) Tf is set to zero in FIG. 16A. In this case, a brake is continuously applied from the start of speed reduction without a free run. As a result, the motor rotation speed is reduced at a reference speed reduction rate Ga indicated by the graph 101.

On the other hand, suppose that the motor drive load Ld is at maximum, for example, 30 mN, and that a brake is continuously applied from the start of speed reduction without a free run. In this case, as shown in a graph 202 in a dashed line, the motor rotation speed is reduced to the reference speed Vc1 at a time point 5. This means that the motor rotation amount (hereinafter "transport distance a") from the start of speed reduction to when the motor rotation speed is reduced to the reference speed Vc1 is significantly reduced in the graph 202 as compared to the case of the graph 101. In order for the stopping distance to fall within the target range, it is necessary to increase the time for powering (between time points t5 and t6) as shown in the graph 202 so as to increase the transport distance after the time point t5. As a result, even though the stopping distance falls within the target range, the stopping time is significantly lengthened.

As described above, the speed reduction rate is smaller in free running than in braking. Accordingly, a combination of free running and braking as shown in the graph 201 can increase the transport distance α.

However, if the free running time Tf is set to be too long, the pulse count Pc may reach the reference value Ps before the motor rotation speed is reduced to the reference speed Vc1, and the stopping distance may fall out of the target range.

Also, during free running, the rotational shaft 635 of the transport motor 63 keeps rotating through inertia. Accordingly, the speed reduction rate is easily changed due to variations in the motor drive load. A change in the speed reduction rate during free running leads to a change in the motor rotation amount per unit time during speed reduction. Therefore, unless the free running time Tf is changed according to the change in the speed reduction rate, the transport distance a may become too long or too short.

Accordingly, in a case where free running is combined with braking, an amount of the motor drive load Ld is detected every time the speed reduction control is performed, and the length of the free running time Tf is determined according to the detected amount of the motor drive load Ld. This prevents the transport distance a from becoming too long or too short.

It is necessary that the detection of the motor drive load Ld be performed before the determination of the free running time Tf. In the present embodiment, the detection of the motor drive load Ld is performed as follows.

That is, voltages of the speed adjustment signal output to the pre-driver 631 of the transport motor 63 are sampled over a time period Tz immediately before the time point to at which speed reduction is performed. At this time, the motor rotation speed is maintained at the predetermined speed Vct which corresponds to the system speed. Then, an average voltage value Vdave, which is an average of the voltages of the speed adjustment signal that have been sampled, is calculated.

As described above, the voltage of the speed adjustment signal varies such that the voltage is raised when the motor rotation speed is lower than a target value, and is lowered when the motor rotation speed is higher than the target value. The voltage of the speed adjustment signal also varies depending on an amount of the motor drive load Ld.

For example, suppose that when the motor drive load Ld is small, the voltage of the speed adjustment signal is set to V1 so that the motor rotation speed is maintained at the target value (system speed), and that while the voltage of the speed adjustment signal is V1, the motor drive load Ld has increased. In this case, the motor rotation speed is reduced due to the increase in the motor drive load. Accordingly, the voltage of the speed adjustment signal needs to be raised from V1 to V2 so that the motor rotation speed is raised back to the target value. When the voltage of the speed adjustment signal is raised, the current flowing into the transport motor 63 per unit time increases by an amount equivalent to the voltage rise, and the motor rotation speed is increased.

On the other hand, if the motor drive load Ld decreases, the motor rotation speed increases due to the decrease in the motor drive load. Accordingly, the voltage of the speed adjustment signal needs to be lowered so that the motor rotation speed is reduced to the target value. When the voltage of the speed adjustment signal is lowered, the current flowing into the transport motor 63 per unit time decreases by an amount equivalent to the voltage drop, and the motor rotation speed is reduced.

As described above, the motor drive load Ld, the voltage of the speed adjustment signal, and the current flowing into the transport motor 63 have the relationship in which, when the motor drive load Ld is small, the voltage of the speed adjustment signal is lowered so as to decrease an amount of current flowing into the transport motor 63, and when the motor drive load Ld is large, the voltage of the speed adjustment signal is raised so as to increase an amount of current flowing into the transport motor 63.

Based on the above, it can be said that the voltage value of the speed adjustment signal indicates an amount of current flowing into the transport motor 63, that the amount of current flowing into the transport motor 63 indicates an amount of the motor drive load Ld; and that the voltage value of the speed adjustment signal indirectly indicates the amount of the motor drive load La.

Accordingly, (i) amounts of the motor drive load Ld corresponding to values of the average voltage value Vdave of the speed adjustment signal and (ii) values of the average voltage value Vdave of the speed adjustment signal corresponding to lengths of the free running time Tf are determined in advance through experiments or the like, under the condition that variations in the stopping distance and variations in the stopping time fall within respective target ranges. In this way, a length of the free running time Tf appropriate for an amount of the motor drive load Ld can be derived from a value of the average value Vdave of the speed adjustment signal.

Figures 18, 19:
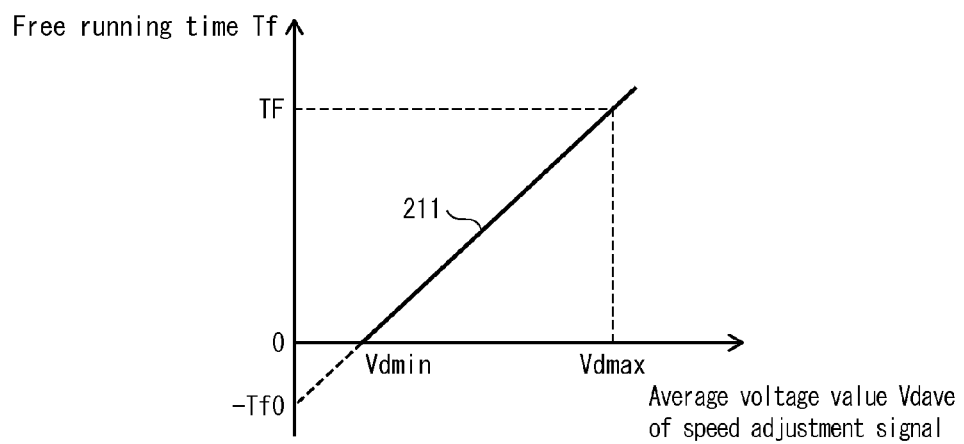
FIG. 18 shows an example of the structure of a table showing the correspondence between average voltage values of a speed adjustment signal and free running times.
FIG. 19 shows a graph indicating the information included in the table of FIG. 18.

[3] Correspondence Between Average Voltage Value Vdave of Speed Adjustment Signal and Free Running Time Tf FIG. 18 shows an example of the structure of a table 210 which is information indicating the correspondence between the average voltage value Vdave of the speed adjustment signal and the free running time Tf. The table 210 is stored in the storage unit 602.

As shown by the table 210, when the average voltage value Vdave of the speed adjustment signal is a minimum value Vdmin, the free running time Tf is a minimum value of zero. When the average voltage value Vdave is a maximum value Vdmax, the free running time Tf is a maximum value of TF. When the average voltage value Vdave is a value Va that is larger than the minimum value Vdmin and smaller than the maximum value Vdmax (Vdmin<Va<Vdmax), the free running time Tf is a value Tfa that is larger than zero and smaller than the maximum value TF (0<Tfa<TF).

Note that the minimum value Vdmin corresponds to an average voltage value of the speed adjustment signal assumed to be detected when the motor drive load is at minimum, and that the maximum value Vdmax corresponds to an average voltage value of the speed adjustment signal assumed to be detected when the motor drive load is at maximum. The values Vdmin, Vdmax, and TF are determined in advance through experiments or the like.

FIG. 19 shows a graph 211 indicating the information included in the table 210. In the graph 211, the horizontal axis represents the average voltage value Vdave of the speed adjustment signal and the vertical axis represents the free running time Tf.

The graph 211 can be expressed by the following formula 1.

$$Tf = A \times Vdave/(Vdmax - Vdmin) - Tf0 \qquad \text{(Formula 1)}$$

Note that A and Tf0 in the above formula are coefficients determined in advance in a manner that when the average voltage value Vdave is the minimum value Vdmin, the free running time Tf becomes zero, and when the average voltage value Vdave is the maximum value Vdmax, the free running time Tf becomes the maximum value TF.

With this formula 1, it is possible to calculate the free running time Tf appropriate for the amount of the motor drive load corresponding to the average voltage value Vdave that have been calculated. Instead of the table 210, the formula 1 may be stored in the storage unit 602.

In a case where the speed adjustment signal is a PWM value instead of a voltage value, an average of duty ratios (average PWM value) can be used instead of the average voltage value Vdave. The duty ratios are sampled over the time period Tz immediately before the time point to at which speed reduction is performed.

In the case of using a PWM value, a value PWMmin is used instead of the minimum value Vdmin, and a value PWMmax is used instead of the maximum value Vmax. The value PWMmin corresponds to an average PWM value assumed to be detected when the motor drive load is at minimum, and the value PWMmax corresponds to an average PWM value assumed to be detected when the motor drive load is at maximum. The same applies to the modifications and embodiments described below.

[4] Flow of Speed Reduction Control

Figure 20:
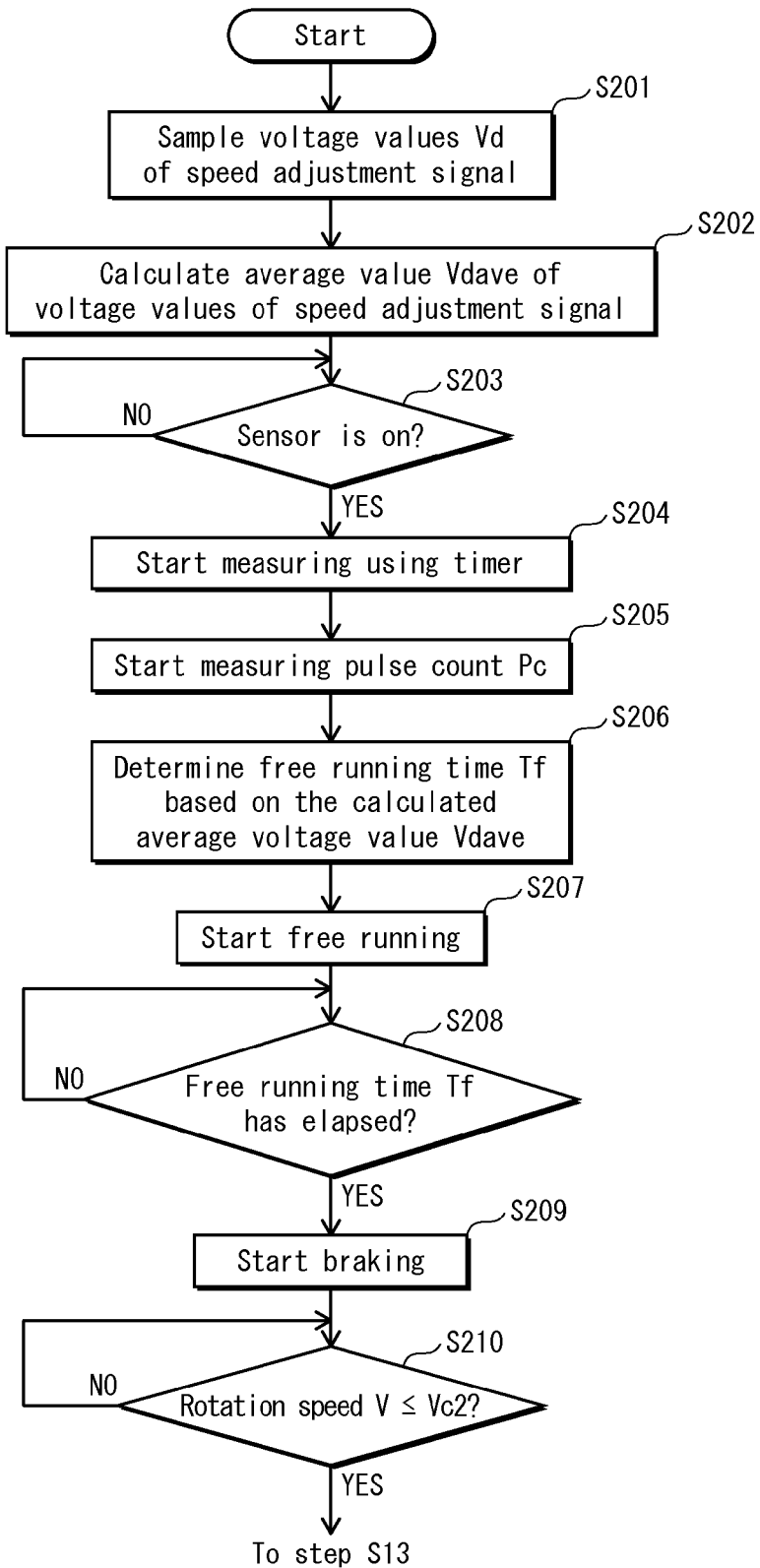
FIG. 20 is a flowchart showing a part of the speed reduction control according to Embodiment 2.

FIG. 20 is a flowchart showing a part of the speed reduction control according to Embodiment 2. In the flowchart, steps S201 to S210 are performed instead of steps S1 to S12 in the speed reduction control according to Embodiment 1.

As shown in FIG. 20, the CPU 601 samples (acquires) the voltage values Vd of the speed adjustment signal over the time period Tz (step S201). As shown in FIG. 16A, this sampling is performed immediately before the time point ta at which speed reduction is started, i.e., immediately before the time point at which the leading edge of a sheet S that is being transported is detected by the registration sensor 38. The number of times sampling is performed is set to three times, for example. However, this number may be set to at least twice or only once.

Determination of whether to start sampling is performed by: measuring the time elapsed since transport of a sheet S subjected to image processing is started; and detecting that the elapsed time has reached a predetermined time period. The predetermined time period is a time assumed to be required from when the transport of the sheet S is started to when the leading edge of the sheet S arrives at a position immediately before the registration sensor 38.

After step S201, the CPU 601 calculates the average voltage value Vdave by calculating an average of the voltage values Vd of the speed adjustment signal that have been sampled (step S202). This calculation is performed before the time point ta at which speed reduction is started. In a case where the voltage value Vd of the speed adjustment signal is acquired only once during the time period Tz, this voltage value Vd alone is used as the average voltage value Vdave. In a case where the speed adjustment signal is a PWM value and a PWM value (duty ratio) is acquired only once during the time period Tz, this PWM value alone is used in place of the average voltage value Vdave.

When the leading edge of the sheet S that is being transported is detected by the registration sensor 38 ("YES" in step S203), the CPU 601 starts measuring time with use of an internal timer (not illustrated) in the motor control unit 60, and starts measuring the pulse count Pc (steps S204 and S205). The step of this measuring is the same as step S2 of Embodiment 1 is performed.

Next, the CPU 601 determines the free running time Tf based on the calculated average voltage value Vdave of the speed adjustment signal (step S206). This determination is performed by referring to the aforementioned table 210 and obtaining the free running time Tf corresponding to the calculated average voltage value Vdave. Alternatively, the determination may be performed with use of the aforementioned formula 1.

When the free running time Tf is determined, the CPU 601 starts free running of the transport motor 63 (step S207). The start of this free running corresponds to the time point to in FIG. 16A.

When the time measured using the internal timer (i.e. the time elapsed since the start of the free running) has reached the determined free running time Tf ("YES" in step S208), the CPU 601 starts braking (step S209). The start of this braking corresponds to the time point t1 in FIG. 16A. At the time point t1, the internal timer is reset.

When the relationship of the motor rotation speed V≤the threshold value Vc2 is satisfied ("YES" in step S210), the processing proceeds to step S13. The processing from step S13 onwards is the same as the process in Embodiment 1.

As described above, according to Embodiment 2, the speed reduction control is performed by: during transport of the sheet S, calculating the average voltage value Vdave of the speed adjustment signal which indirectly indicates the motor drive load immediately before speed reduction; determining the free running time Tf based on a result of the calculation; performing free running of the transport motor 63 from the start of speed reduction for the determined free running time Tf; and switching from the free running to braking.

With this control, during the time period from the start of speed reduction to when the motor rotation speed is reduced to the reference speed Vc1, free running is performed once for a determined time period, and thereafter switching is performed from free running to braking. This simplifies the speed reduction control.

In the above description, the free running time Tf is determined (step S206) after the leading edge of the sheet S that is being transported is detected by the registration sensor 38 ("YES" in step S203). However, it is not limited to such. For example, the free running time Tf may be determined between steps S202 and S203.

[5] Modifications of Embodiment 2

In the above description, the average voltage values Vdave of the speed adjustment signal and the free running times Tf are in one-to-one correspondence in the table 210 or in the formula 1. However, no limitation is intended thereby.

For example, depending on the structure of the apparatus, the range of average voltage values Vdave of the speed adjustment signal from the minimum value to the maximum value may be divided into partial ranges, and each of the partial ranges may be associated with a different length of the free running time Tf.

Also, instead of using only the average voltage value Vdave of the speed adjustment signal, a difference Vk, which is a value obtained by subtracting the minimum value Vdmin from the average voltage value Vdave, may be associated with the free running time Tf, for example.

FIG. 21A shows an example of the structure of a table 221 showing the correspondence between the difference Vk (V) and the free running time Tf (ms).

As shown by the table 221 in FIG. 21A, the magnitude of the difference Vk is divided into three levels, and each level of the difference Vk is associated with a different length of the free running time Tf in a manner that the larger the difference Vk, the longer the free running time Tf.

The difference Vk is expressed by the following formula: the average voltage value Vdave−the minimum value Vdmin. Since the average voltage value Vdave rises as the motor drive load increases, the difference Vk and the motor drive load have the relationship where the larger the motor drive load, the larger the difference Vk.

An increase in the motor drive load causes a decrease in the motor rotation amount (transport distance) per unit time during free running. Accordingly, the free running time Tf is set to be longer for a larger difference Vk. This suppresses variations in the transport distance during free running.

Also, instead of using only the difference Vk, a difference Vm, which is a value obtained by subtracting the average voltage value Vdave from the maximum value Vdmax, may be associated with the free running time Tf, for example.

FIG. 21B shows an example of the structure of a table 222 showing the correspondence between the difference Vm (V) and the free running time Tf (ms).

As shown by the table 222, the difference Vm is associated with the free running time Tf in a manner that the larger the difference Vm, the shorter the free running time Tf.

An increase in the difference Vm causes a decrease in the motor drive load. Accordingly, the free running time Tf is set to be shorter for a larger difference Vm. This suppresses variations in the transport amount even if the difference Vm is large, and also suppresses variations in the transport amount during free running.

In the above descriptions, the range of each of the differences Vk and Vm is divided into three levels. However, no limitation is intended thereby, and each of these ranges may be divided into multiple levels other than three.

EMBODIMENT 3

According to Embodiment 2, free running and braking are performed in the stated order from the start of speed reduction. However, Embodiment 3 differs from Embodiment 2 in that the speed reduction control is performed in the order of braking and free running.

[1] Timing Chart Showing Speed Reduction Control

Figure 22A:
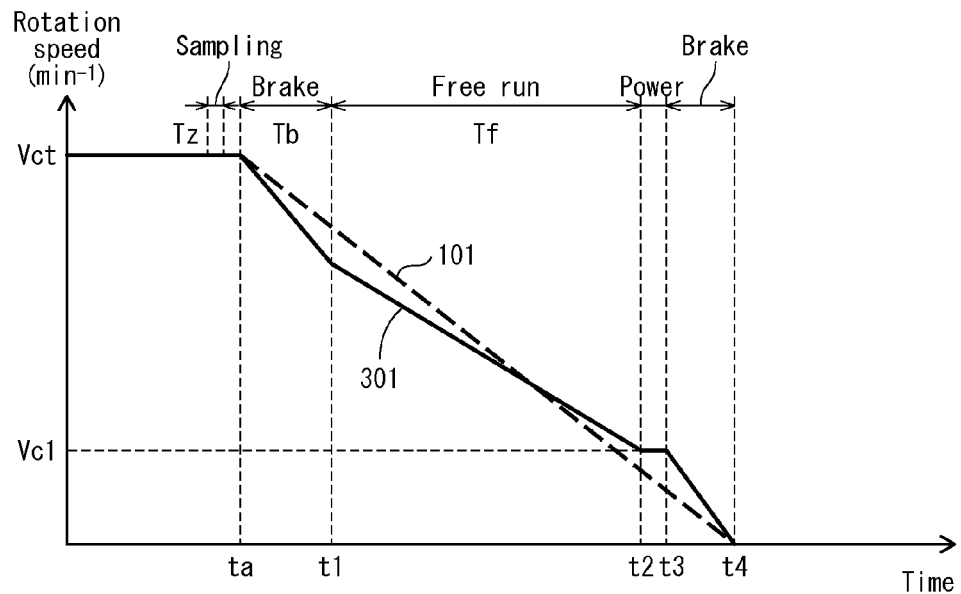
FIGS. 22A and 22B are each a timing chart showing a speed reduction control according to Embodiment 3.
Figure 22B:
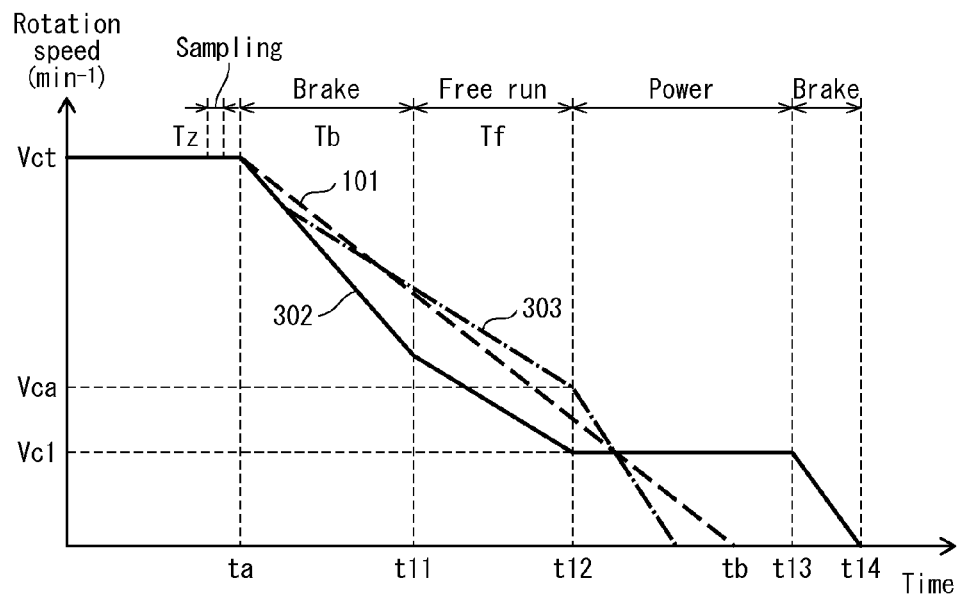

FIGS. 22A and 22B are each a timing chart showing a speed reduction control according to Embodiment 3, where FIG. 22A shows changes in the motor rotation speed in an embodiment example, and FIG. 22B shows changes in the motor rotation speed in a comparative example.

In FIG. 22A, a graph 101 shows changes in the motor rotation speed when the motor drive load is at minimum, and a graph 301 shows changes in the motor rotation speed when the motor drive load is larger than the minimum load.

In the graph 301, braking is performed from the start of speed reduction (time point ta) to a time point t1, free running is performed from the time point t1 to a time point t2, powering is performed from the time point t2 to a time point t3, and last braking is performed from the time point t3 to a time point t4. The control from the time point t2 onwards is the same as in Embodiment 2.

A graph 302 in FIG. 22B differs from the graph 301 in FIG. 22A in that braking time Tb (i.e., time period during which a brake is applied) is longer than the braking time Tb in the graph 301.

As the braking time Tb (time points ta to t11) is increased, the free running time Tf (time points t11 and t12) is shortened. As a result, the transport distance a from the start of speed reduction to when the motor rotation speed is reduced to the reference speed Vc1 is shortened, as compared to the control shown by the graph 101. This causes an increase in the time period for powering (time points t12 to t13), and the stopping time (time points ta to t14) is lengthened significantly.

On the other hand, a graph 303 shows that the braking time Tb is significantly shortened. In this case, although the free running time Tf is increased, this increase causes the relationship of the pulse count Pc≥the reference value Ps to be satisfied at the time point t12 which is a time point before the motor rotation speed is reduced to the reference speed Vc1, and the last braking is started from the time point t12.

In the control of the graph 303 in FIG. 22B, although the stopping time can be reduced as compared to the graph 101, a motor rotation speed Vca at the time point t12 at which the last braking is started is significantly larger than the reference speed Vc1. As the motor rotation speed Vca is increased, the area Md shown in FIG. 7 is increased and the maximum value $\delta_{max}$ of variations is increased.

Accordingly, in the control of the graph 303 where the last braking is started when the motor rotation speed is reduced to the speed Vca which is higher than the reference speed Vc1, variations in the stopping distance become larger than in the control where the last braking is started when the motor rotation speed is reduced to the reference speed Vc1. As a result, the stopping distance may greatly fall out of a reference stopping distance Ls.

In view of the above, it is preferable that the braking time Tb be determined such that the time point at which the motor rotation speed is reduced to the reference speed Vc1 immediately precedes the time point at which the pulse count Pc reaches the reference value Ps. However, since the speed reduction rate by braking is varied greatly depending on the motor drive load, the braking time Tb cannot be determined as a fixed time.

Accordingly, similarly to the free running time Tf in Embodiment 2, the braking time Tb may be determined according to the amount of the motor drive load, i.e., the average voltage value Vdave of the speed adjustment signal. In this way, the braking time Tb is determined appropriately for the amount of the motor drive load Ld, and variations in the stopping distance and the stopping time fall within the respective target ranges.

Figure 23:
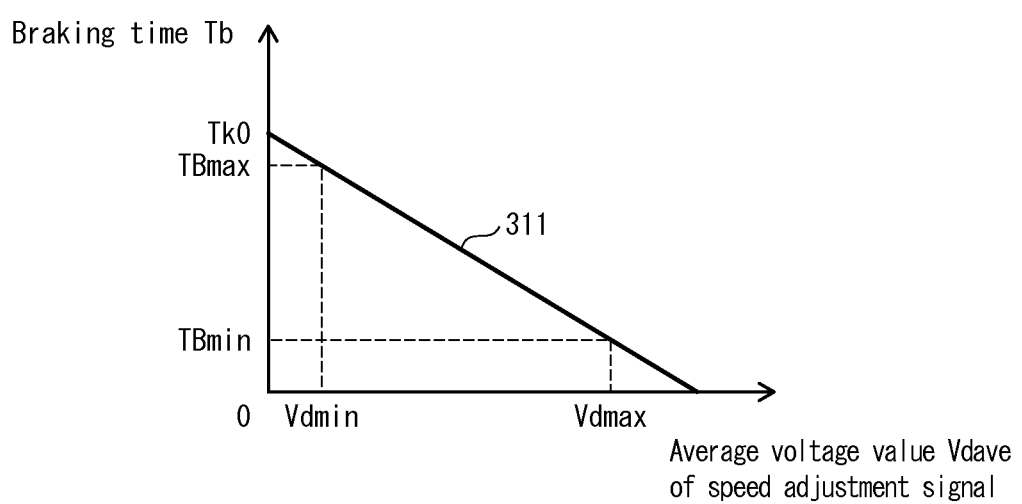
FIG. 23 shows a graph indicating the correspondence between an average voltage value of the speed adjustment signal and braking time.

[2] Correspondence Between Average Voltage Value Vdave of Speed Adjustment Signal and Free Running Time Tf FIG. 23 shows a graph 311 indicating the correspondence between the average voltage value Vdave of the speed adjustment signal and the braking time Tb.

The value Vdmin in FIG. 23 is the average voltage value of the speed adjustment signal when the motor drive load is at minimum, and the value Vdmax is the average voltage value of the speed adjustment signal when the motor drive load is at maximum. Also, the time TBmin in FIG. 23 is the braking time when the motor drive load is at maximum, and the time TBmax is the braking time when the motor drive load is at minimum. The values Vdmin, Vdmax, TBmin, and TBmax are determined in advance through experiments or the like.

The graph 311 can be expressed by the following formula 2.

$$Tb = -B \times Vdave/(Vdmax - Vdmin) + Tk0 \quad \text{(Formula 2)}$$

Note that B and Tk0 in the above formula are coefficients determined in advance in a manner that when the average voltage value Vdave is the value Vdmin, the braking time Bk becomes the time TBmax, and when the average voltage value Vdave is the value Vdmax, the braking time Bk becomes the time TBmin.

The formula 2 is derived in advance through experiments or the like in a manner that variations in the stopping distance and the stopping time fall within the respective target ranges. The formula 2 is stored in the storage unit 602 as the information indicating the correspondence between the average voltage value Vdave of the speed adjustment signal and the braking time Tb. With this formula 2, it is possible to calculate the braking time Tb appropriate for the amount of the motor drive load corresponding to the average voltage value Vdave that have been calculated.

[3] Flow of Speed Reduction Control

Figure 24:
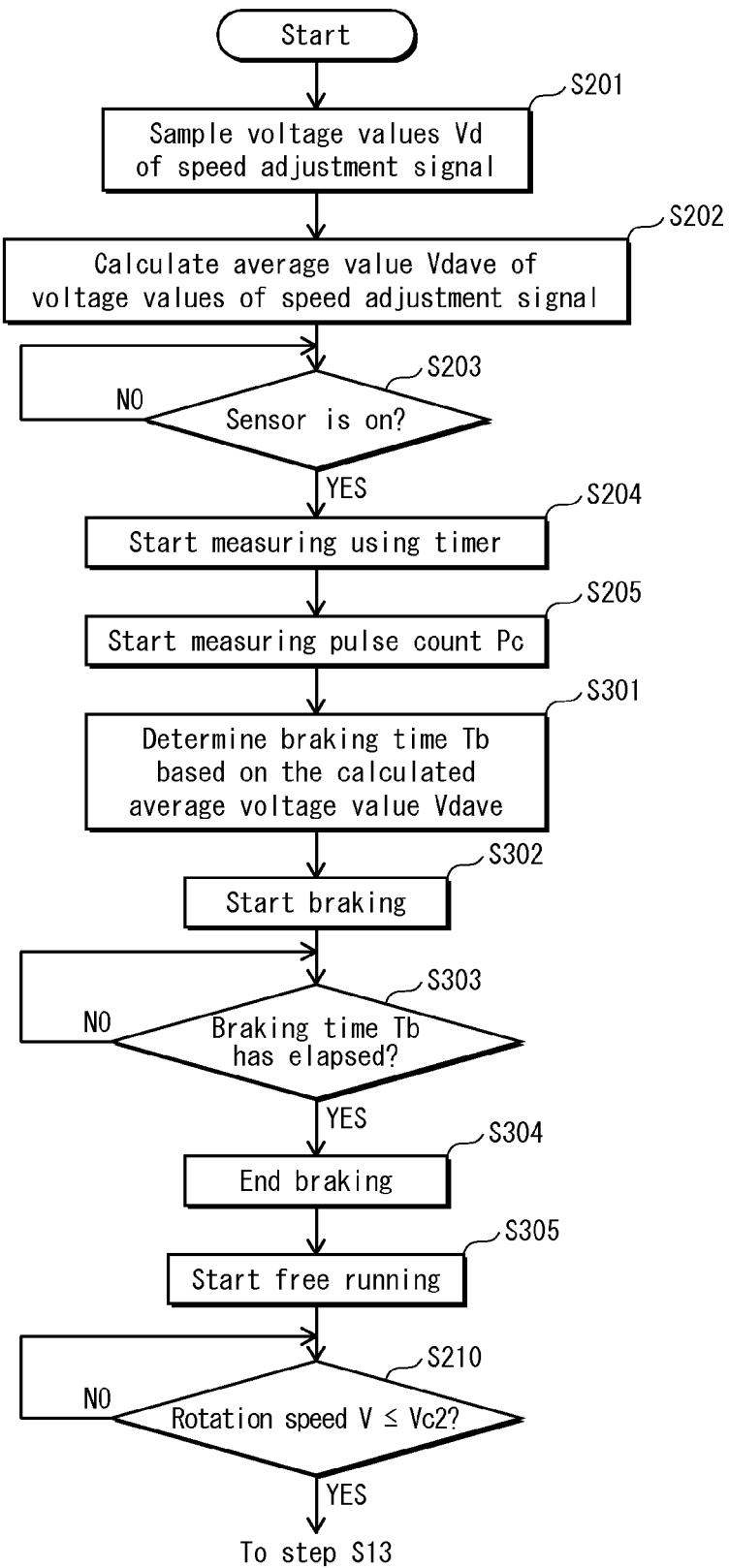
FIG. 24 is a flowchart showing a part of the speed reduction control according to Embodiment 3.

FIG. 24 is a flowchart showing a part of the speed reduction control according to Embodiment 3. In the flowchart, steps S301 to S305 are performed instead of steps S206 to S209 in the speed reduction control according to Embodiment 2. Steps S201 to S205 are the same as those in the speed reduction control in Embodiment 2. The descriptions thereof are thus omitted.

As shown in FIG. 24, in step S301, the CPU 601 determines the braking time Tb based on the average voltage value Vdave of the speed adjustment signal calculated in step S202. This determination is performed by calculating the braking time Tb corresponding to the calculated average voltage value Vdave, with use of the aforementioned formula 2.

Upon determining the braking time Tb, the CPU 601 starts braking (step S302). The start of this braking corresponds to the time point to in FIG. 22A.

Subsequently, when the time measured using the internal timer (i.e. the time elapsed since the start of the braking) has reached the determined braking time Tb ("YES" in step S303), the CPU 601 ends braking (step S304), and starts free running (step S305). The start of this free running corresponds to the time point t1 in FIG. 22A. At the time point t1, the internal timer is reset. After the free running is started, the processing proceeds to step S210 and then to step S13. The processing from step S13 onwards is basically the same as the processing according to Embodiment 1 as showing in FIG. 9, except that in step S19, the CPU 601 switches from free running to braking, instead of continuously applying braking.

As described above, according to Embodiment 3, the speed reduction control is performed by: calculating the average voltage value Vdave of the speed adjustment signal that indicates the motor drive load immediately before speed reduction; determining the braking time Tb based on a result of the calculation; applying braking from the start of speed reduction for the determined braking time Tb; and switching from braking to free running.

With this control, braking is performed once for a determined time period, and thereafter switching is performed from braking to free running. This simplifies the speed reduction control. In the above description, the braking time Tb is determined (step S301) after step S203. However, it is not limited to such. For example, the braking time Tb may be determined between steps S202 and S203.

[4] Modifications of Embodiment 3

In the above description, the braking time Tb is determined based on the average voltage value Vdave of the speed adjustment signal with use of the formula 2. However, no limitation is intended thereby.

For example, instead of the formula 2, a table showing the correspondence between the average voltage value Vdave of the speed adjustment signal and the braking time Tb may be stored in the storage unit 602, and the braking time Tb may be determined with reference to the table.

Alternatively, a difference Vr, which is a value obtained by subtracting the average voltage value Vdave from the maximum value Vdmax, may be associated with the braking time Tb, for example.

Figures 25, 26:
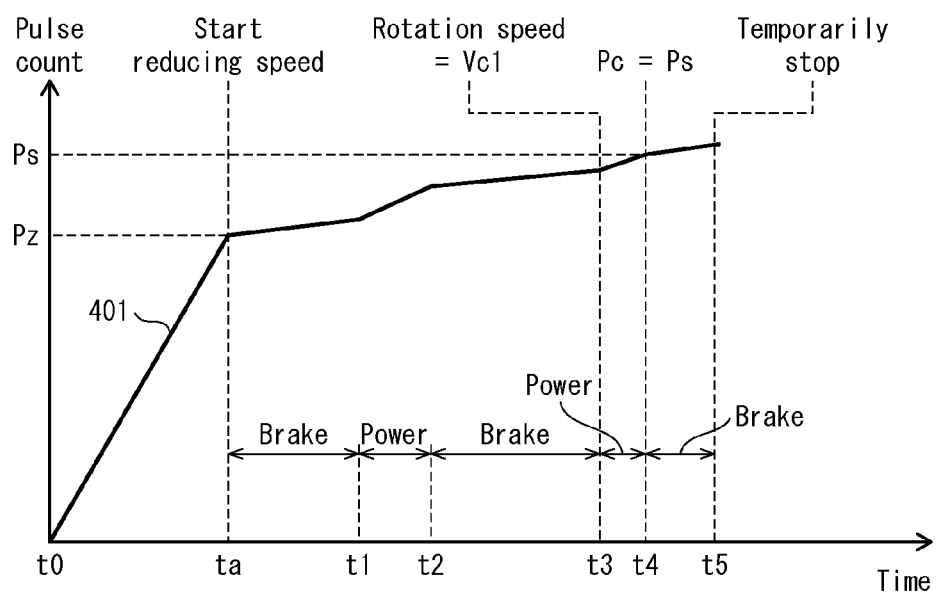
FIG. 25 shows an example of the structure of a table showing the correspondence between braking times and differences each obtained by subtracting an average voltage value from a maximum voltage value of the speed adjustment signal.
FIG. 26 is a timing chart showing changes in a pulse count according to Embodiment 4.

FIG. 25 shows an example of the structure of a table 312 showing the correspondence between the difference Vr (V) and the braking time Tb (ms).

As shown by the table 312, the difference Vr is associated with the braking time Tb in a manner that the larger the difference Vr, the longer the braking time Tb.

An increase in the difference Vr causes a decrease in the motor drive load. Accordingly, the braking time Tb is set to be longer for a larger difference Vr. This suppresses variations in the transport amount even if the difference Vr is large, and also suppresses variations in the transport amount during braking. In the above descriptions, the range of the difference Vr is divided into three levels. However, no limitation is intended thereby, and the range may be divided into multiple levels other than three.

Furthermore, instead of associating the difference Vr and the braking time Tb, a difference obtained by subtracting the minimum value Vdmin from the average voltage value Vdave may be associated with the braking time Tb.

EMBODIMENT 4

According to Embodiments 1 to 3 above, the speed reduction control is started when the leading edge of a sheet S that is being transported is detected by the registration sensor 38. Embodiment 4 differs from Embodiments 1 to 3 in that the speed reduction control is started when the pulse count Pc measured during the transport of the sheet S reaches a predetermined value Pz, instead of when the registration sensor 38 detects the leading edge of the sheet S.

[1] Timing Chart Showing Changes in Pulse Count Pc

FIG. 26 is a timing chart showing changes in the pulse count Pc measured during the time period from the start of the transport of a sheet S by the transport rollers 34 to the stop of the sheet S by a registration operation.

A graph 401 in FIG. 26 shows changes in the pulse count Pc during the speed reduction control according to Embodiment 1. A time point ta indicates the start of a speed reduction control, a time point t1 indicates the start of powering, a time point t2 indicates the start of braking, a time point t3 indicates a time point at which the motor rotation speed is reduced to the reference speed Vc1, a time point t4 indicates the start of last braking, and a time point t5 indicates the stop of the sheet S.

At a time point t0, the leading edge of a sheet S is present between a nip formed by the transport rollers 34 that are in a non-rotation state, and the transport of the sheet S is started at this time point t0 by the rotation of the transport rollers 34.

As shown by the graph 401, the pulse count Pc is zero at the time point t0, and the pulse count Pc is increased to the predetermined value Pz at the time point ta.

The predetermined Pz is calculated in advance by the following formula 3.

$$Pz = (La+Lb) \times Pk - Pd \quad \text{(Formula 3)}$$

In the above formula, La denotes the distance (mm) of the conveyance path 39 from the transport rollers 34 to the registration rollers 35, and Lb denotes the transport amount (mm) of a sheet S required for the formation of a loop Lp having a size of the reference value.

Pk denotes the pulse count (i.e., the number of pulses) corresponding to the rotation amount when the rotational shaft 635 of the transport motor 63 rotates to transport the sheet S for 1 mm, and Pd denotes the pulse count corresponding to the minimum rotation amount necessary during the rotation of the rotational shaft 635 from the start of speed reduction to the stop of the sheet S.

For example, suppose that La=110 (mm), Lb=7 (mm), Pk=66.67 (pulse count/mm), and Pd=40 (pulse count). In this case, the predetermined value pz is 7760 (pulse count).

In other words, suppose that a speed reduction control is started at the time point ta, which is the time point at which the pulse count Pc measured from the time point t0 reaches 7760, and that the pulse count necessary for the speed reduction control is 40. In this case, the pulse count Pc when the transport of the sheet S is stopped is 7800. In the case where the cumulative pulse count Pc from the start of the transport of the sheet S to the stop of the sheet S is 7800, this value, 7800, is divided by Pk to obtain 117 (mm). This value, 117 (mm), is the transport distance of the sheet S from the start of transport to the stop of the sheet S.

When the transport distance is 117 mm, this means that the leading edge of the sheet S is transported for another 7 mm, in addition to 110 mm which is the distance from the transport rollers 34 to the registration rollers 35. A leading end portion of the sheet S corresponding to 7 mm is used for loop forming processing, whereby a loop Lp having the size of the reference value is formed in the leading end portion.

Note that Embodiment 4 differs from Embodiments 1 to 3 with respect to the timing at which measuring of the pulse count Pc is started. Specifically, in Embodiment 4, the pulse count Pc is measured from the start of the transport of a sheet S, whereas in Embodiments 1 to 3, the pulse count Pc is measured from the start of speed reduction. Accordingly, in the case where the speed reduction control is started based on the pulse count Pc according to Embodiment 4, the reference value Ps according to Embodiment 1 to 3 may be replaced with the sum of the reference value Ps and the predetermined value Pz.

[2] Flow of Speed Reduction Control 1

Figure 27:
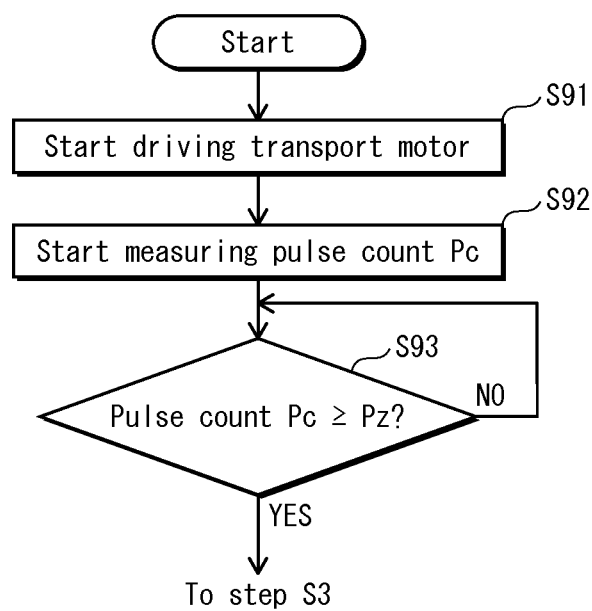
FIG. 27 is a flowchart showing a part of a speed reduction control according to Embodiment 4.

FIG. 27 is a flowchart showing a part of a speed reduction control in which the structure of starting the speed reduction control based on the pulse count Pc is combined with the structure according to Embodiment 1. The flowchart in FIG. 27 differs from the flowchart in FIG. 8 which shows the speed reduction control according to Embodiment 1, in that steps S91 to S93 are performed instead of steps S1 and S2 in FIG. 8.

As shown in FIG. 27, the CPU 601 starts driving the transport motor 63 to rotate (step S91), and starts measuring the pulse count Pc of the pulse signal output from the encoder 633 of the transport motor 63 (step S92).

When the measured pulse count Pc reaches the predetermined value Pz ("YES" in step 93), the processing proceeds to step S3. Processing of braking, powering, etc., performed from step S3 onwards is the same as in Embodiment 1.

[3] Flow of Speed Reduction Control 2

Figure 28:
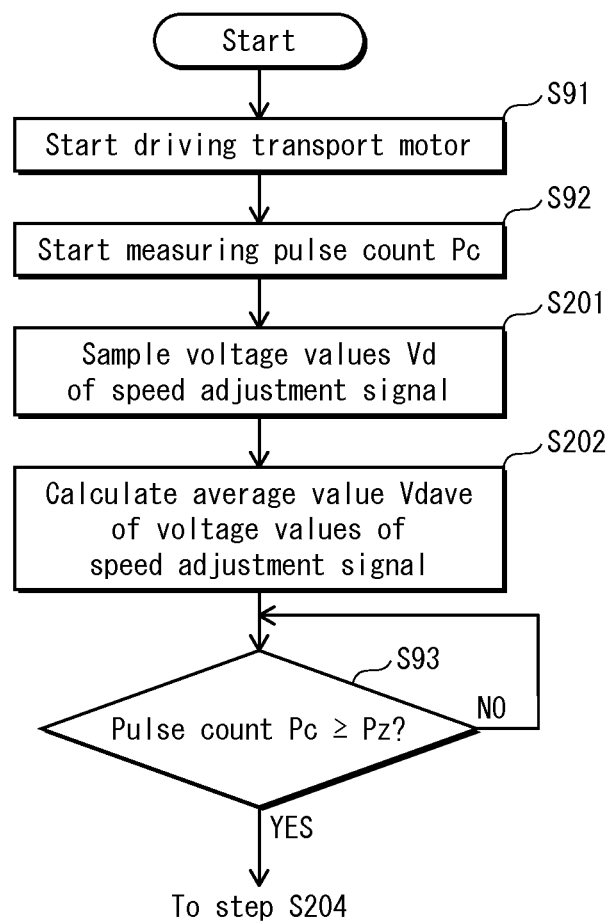
FIG. 28 is a flowchart showing a part of a different speed reduction control according to Embodiment 4.

FIG. 28 is a flowchart showing a part of a speed reduction control in which the structure of starting the speed reduction control based on the pulse count Pc is combined with the structure according to Embodiment 2. The flowchart in FIG. 28 differs from the flowchart in FIG. 20 which shows the speed reduction control according to Embodiment 2, in that steps S91 and S92 are performed before step S201, and step S93 is performed instead of step S203.

As shown in FIG. 28, the CPU 601 starts driving the transport motor 63 to rotate (step S91), and starts measuring the pulse count Pc of the pulse signal output from the encoder 633 of the transport motor 63 (step S92).

Then, the CPU 601 samples the voltage values Vd of the speed adjustment signal (step S201), and calculates the average voltage value Vdave (step S202). When the measured pulse count Pc reaches the predetermined value Pz ("YES" in step S93), the processing proceeds to step S204. Processing of free running, braking, etc., performed from step S204 onwards is the same as in Embodiment 2.

Note that the structure of starting the speed reduction control based on the pulse count Pc may be combined with the structure according to Embodiment 3 instead of the structure according to Embodiment 2. In this case, steps S91 and S92 in FIG. 28 are performed before step S201 in FIG. 24, and step S93 in FIG. 28 is performed instead of step S203 in FIG. 24.

As described above, the value Pz of the pulse count Pc is calculated in advance through experiments, etc., depending on the structure of the apparatus. This allows for the same speed reduction control as each of the controls according to Embodiments 1 to 3 while the timing for starting the speed reduction control is determined without relying on the registration sensor 38.

The present invention is not limited to an image processing apparatus such as an image forming apparatus or an image reading apparatus, and may be a method for controlling the rotation of a motor. Alternatively, the present invention may be a computer program for causing an image processing apparatus to perform a method for controlling the rotation of a motor, or a computer-readable recording medium storing the computer program thereon. The recording medium may be a non-transitory computer-readable recording medium. For example, the recording medium may be a magnetic disk such as a flexible disk, an optical recording medium such as a DVD-ROM, a flash memory-type recording medium, or the like. This recording medium with the computer program stored thereon may be manufactured or transferred. Furthermore, the computer program may be supplied by transmission over wired or wireless networks including the Internet, by broadcasting, over telecommunications networks, or by satellite transmission. Also, the image processing apparatus may be a computer system comprising a microprocessor and a memory, the memory storing the computer program therein and the microprocessor being operated according to the computer program.

<Modifications>

Although the present invention has been described based on the embodiments, it is obvious that the present invention is not limited to the above embodiments, and various modifications may be implemented.

(1) According to each of the above embodiments, during the speed reduction control, when the pulse count Pc reaches the reference value Ps ("YES" in step S13) on or before the time point at which the motor rotation speed is reduced to the predetermined rotation speed Vc2 (>reference speed Vc1), the last braking is performed (step S19). In other words, even if the pulse count Pc reaches the reference value Ps, the last braking is not performed until the motor rotation speed is reduced to the rotation speed Vc2. However, it is not limited to such.

For example, it is possible to employ a structure in which the rotation speed Vc2 is not set.

As described above, the rotation speed Vc2 is set for the exceptional control which is performed when the pulse count Pc reaches the reference value Ps before the motor rotation speed is reduced to the reference speed Vc1. However, variations in the stopping distance may fall within the target range without the exceptional control depending on the structure of the apparatus.

With the structure in which the rotation speed Vc2 is not set, the determination step regarding the relationship of the motor rotation speed≤the rotation speed Vc2 does not need to be performed. This simplifies the speed reduction control.

(2) In the speed reduction control according to each of Embodiments 1 to 4 above, the motor rotation speed is maintained at the reference speed Vc1 by powering during the time period (time points t3 and t4 in FIG. 5A) from when the motor rotation speed is reduced to the reference speed Vc1 to when the pulse count Pc reaches the reference value Ps. However, no limitation is intended thereby. For example, when the motor rotation speed is reduced to the reference speed Vc1, free running may be performed instead of powering.

When free running is performed, the motor rotation speed will gradually decrease from the reference speed Vc1. However, as long as the free running is performed within the range that allows for measuring of the pulse count Pc in a higher-speed period than the low-speed period shown by the comparative example, variations in the stopping distance and the stopping time will be small unlike in the case of the feedback control in the low-speed period.

Also, powering is not only performed for the purpose of maintaining the reference speed Vc1. For example, as long as variations in the stopping distance and the stopping time fall within the respective target ranges, powering may be performed so as to slightly reduce or increase speed. In the case of reducing speed, powering may be performed in a manner that the speed reduction rate becomes smaller than the speed reduction rate during free running.

(3) According to Embodiment 2, every time one of the sheets S is transported, the average voltage value Vdave of the speed adjustment signal is calculated immediately before the start of a speed reduction control with respect to the sheet S. Then, the free running time Tf is determined based on the calculated average voltage value Vdave. However, the average voltage value Vdave does not need to be calculated for each sheet S.

For example, suppose that a print job is performed to sequentially form images on N (N being larger than one) sheets S. In this case, the average voltage value Vdave may be calculated for a sheet S that is initially transported among the N sheets S, and the free running time Tf may be determined based on the calculated average voltage value Vdave. The free running time Tf thus determined may be used for the speed reduction control for the sheet S as well as for the speed reduction control to be performed for the rest of the N sheets S.

This is because even if the same free running time Tf is applied to each of the first sheet S to the $N^{th}$ sheet S, there is a case where variations in the stopping distance and variations in the stopping time fall within the respective target ranges as long as variations in the motor drive load during the print job for the N sheets S are negligible.

With the above structure, calculation of the average voltage value Vdave can be eliminated from the second sheet onwards, and the speed reduction control can be simplified.

Also, suppose that variations in the motor drive load gradually occur over a long period of time. In this case, the free running time Tf may be determined based on the average voltage value Vdave that is calculated every time the printer 100 is activated (i.e., every time the printer 100 is supplied with power), or every predetermined number of sheets subjected to print jobs, etc., instead of every time one print job is performed. Then, the free running time Tf thus determined may be applied to each sheet until the next time the free running time Tf is newly determined.

Furthermore, the free running time Tf may be determined at a timing differing from the timing of transporting sheets S. For example, the transport motor 63 may be driven during a warm-up period from when the printer 100 is powered on or when the printer 100 is recovered from a trouble, such as a paper jam, to when the printer 100 is placed in a state where image formation is possible. Then, the average voltage value Vdave may be calculated while the transport motor 63 is driven to determine the free running time Tf, and the free running time Tf thus determined may be used for a speed reduction control performed on sheets S targeted for the print job after the warm-up period.

(4) According to Embodiments 2 and 3, the average voltage value Vdave of the speed adjustment signal is acquired as the information indirectly indicating the motor drive load. However, a structure other than using the average voltage value Vdave may be employed as long as the structure allows for detection of the motor drive load either directly or indirectly.

For example, a current sensor may be provided that detects the amount of current flowing into the transport motor 63 as information indicating the motor drive load, and variations in the motor drive load may be detected based on detection values obtained from the current sensor.

In this case, values of the amounts of current flowing into the transport motor 63 corresponding to either lengths of the free running time Tf or lengths of the braking time Tb may be determined in advance through experiments or the like, under the condition that variations in the stopping distance and variations in the stopping time fall within respective target ranges. In this way, free running or braking may be performed for a time period suitable for the motor drive load corresponding to a detected amount of current, i.e., at the time of the detection of the amount of current. Alternatively, a torque sensor or the like may be used instead of the current sensor.

In a case where the average voltage value Vdave of the speed adjustment signal is not used, the storage unit 602 may store information (i.e., a table, a formula, etc.,) indicating the correspondence between (i) current values detected by the current sensor or torque values detected by the torque sensor and (ii) lengths of the free running time Tf or lengths of the braking time Tb.

(5) According to the above embodiments, the reference speed reduction rate Gs is the motor rotation speed on the presumption that the motor drive load is at minimum, and that the rotational speed of the transport motor 63 is reduced by simply applying a brake during the speed reduction control. The stopping distance and the stopping time in a case where speed reduction is performed at the reference speed reduction rate Gs are set as a reference stopping distance and a reference stopping time, respectively. The threshold value Sa, the reference value Ps, etc., are determined in advance in a manner that even if the motor drive load is larger than the minimum load, the stopping distance and the stopping time fall within the target range including the reference stopping distance and the target range including the reference stopping distance, respectively. However, no limitation is intended thereby.

For example, the maximum load or an estimated intermediate value between the maximum load and the minimum load may be used as a reference, and the threshold value Sa, the reference value Ps, etc., may be determined in advance through experiments or the like in a manner that the stopping distance and the stopping time fall within the target range.

(6) According to the above embodiments, a short brake is used as a brake during the speed reduction control. However, a brake other than a short brake may be used as long as the brake is applicable to the rotation of the transport motor 63. For example, a mechanical brake may be provided on a transmission path for transmitting the drive force of the transport motor 63 to the transport rollers 34, and the mechanical brake may be applied to the rotation of the transport motor 63.

(7) According to the above embodiments, each of the motors, such as the transport motor 63, is a DC brushless motor. However, these motors may be motors other than the DC brushless motors.

Also, although it is described above that the CPU 601 of the motor control unit 60 performs the speed reduction control, etc., a unit other than the CPU 601 may perform the speed reduction control, etc., as long as the unit has the same function as the CPU 601. For example, an ASIC (Application Specific Integrated Circuit) may be used instead of the CPU 601.

Furthermore, although it is described above that the pre-driver 631 is provided inside the transport motor 63, the structure is not limited to such, and the pre-driver 631 may be provided inside the motor control unit 60. Furthermore, the encoder 633, which is provided inside the transport motor 63 in the above description, may instead be provided at a position at which the rotation of a rotational shaft on the aforementioned transmission path is detectable.

(8) The above embodiments include descriptions of the structure of the tandem color printer 100, which is an example of the image forming apparatus according to the present invention. However, the image forming apparatus is not limited to the printer 100, and may be a copier, a fax machine, an MFP (Multiple Function Peripheral), etc., for example.

Furthermore, the present invention is applicable to an image reading apparatus, such as a scanner. In this case, the speed reduction control is performed when documents subjected to image reading processing by the image reading apparatus are transported to a reading position.

Specifically, the image reading apparatus has a function of: feeding the documents placed on a document tray to a transport path one at a time; forming a loop at the leading end portion of the fed document by a pair of transport rollers (corresponding to the pair of transport rollers 34) and a pair of registration rollers (corresponding to the pair of registration rollers 35) located more downstream than the pair of transport rollers in a document transport direction; after forming the loop, transporting the document to the reading position at a timing of image reading processing; and optically reading an image on the document while the document is passing through the reading position. When the image reading apparatus having such a function controls a motor (corresponding to the transport motor 63) that drives the transport rollers to rotate, the image reading apparatus can perform the same speed reduction control as described above.

Also, the above speed reduction control can be performed not only when the transport of a sheet, such as a sheet S or a document, is temporarily stopped for loop forming processing, but also when the transport of a sheet is temporarily stopped for other processing than the loop forming processing. For example, the transport of a sheet may be temporarily stopped to wait for an appropriate timing for image forming processing or sheet reading processing, and may be resumed when the appropriate timing arrives.

In other words, the present invention is applicable to a general image processing apparatus, such as an image forming apparatus or an image reading apparatus, that performs a speed reduction control when a transport roller that is rotating to transport a sheet subjected to image processing is to be stopped through a registration operation or the like.

The values of the reference speed Vc1, the rotation speed Vc2, the free running time Tf, the braking time Tb, etc., are not limited to the values described above, and may be determined appropriately for the structure of the apparatus.

The present invention may be any combination of the embodiments and modifications described above.

<Conclusion>

The embodiments above and modifications described above show one aspect of the present invention which solves the problem described in the RELATED ART section. The embodiments and the modifications can be summarized as follows.

First aspect of the present invention is an image processing apparatus including a transport roller for transporting a sheet subjected to image processing, the image processing apparatus comprising: a motor configured to drive the transport roller to rotate; and a speed reduction unit configured to perform a speed reduction control on the motor to temporarily stop the sheet that is being transported, the speed reduction control being performed in a manner that a stopping time and a stopping distance each satisfy a corresponding target range, the stopping time being a time period from a start of the speed reduction control to a stop of the sheet, and the stopping distance being a distance traveled by the sheet from the start of the speed reduction control to the stop of the sheet, wherein the speed reduction control includes a first control and a second control following the first control, the first control is a control of reducing a rotation speed of the motor to a reference speed through at least two operations from among a braking operation, a powering operation, and a free running operation, the at least two operations including the braking operation, and the reference speed being a speed lower than a rotation speed Vct that is a speed of the motor at the start of the speed reduction control, and the second control is a control of, after a rotation amount of the motor from the start of the speed reduction control reaches a reference value, continuously performing the braking operation until the stop of the motor.

Also, in the first control, after the rotation speed of the motor reaches the reference speed, the rotation speed may be maintained at the reference speed by the powering operation until the rotation amount from the start of the speed reduction control reaches the reference value.

Furthermore, the image processing apparatus may further comprise a load detection unit configured to detect an amount of a drive load of the motor, wherein the first control may include a control of: determining, in accordance with the detected amount of the drive load, a time period during which the free running operation or the braking operation is performed; performing the free running operation or the braking operation for the determined time period from the start of the speed reduction control; and after the determined time period, performing the braking operation or the free running operation until the rotation speed of the motor is reduced to the reference speed.

Also, the image processing apparatus may further comprise a control unit configured to, before the speed reduction control, variably control an amount of electric current flowing into the motor such that the rotation speed of the motor is maintained at a predetermined speed corresponding to a speed at which the sheet is transported, wherein the load detection unit may acquire, while the sheet is being transported before the speed reduction control, information indicating the amount of electric current flowing into the motor, and may detect the amount of the drive load based on the acquired information.

Furthermore, the control unit may give an instruction to the motor to increase the amount of electric current flowing into the motor when a current rotation speed of the motor is lower than the predetermined speed, and may give an instruction to the motor to reduce the amount of electric current flowing into the motor when the current rotation speed of the motor is higher than the predetermined speed, the information indicating the amount of electric current flowing into the motor may be a signal indicating the amount of electric current indicated by the instruction from the control unit to the motor, and the load detection unit may detect the amount of electric current instructed by the control unit to the motor as the amount of the drive load.

Also, the control unit may give the instruction to either increase or reduce the amount of electric current by variably changing a voltage value of the signal, and the load detection unit may acquire one voltage value of the signal or a plurality of voltage values of the signal before the speed reduction control, and may detect the one voltage value or an average of the plurality of voltage values as the amount of electric current.

Furthermore, the image processing apparatus may further comprise a storage unit storing therein information pieces each indicating a correspondence between (i) a voltage value of the signal or an average of voltage values of the signal and (ii) a time period during which the free running operation or the braking operation is performed, wherein the first control may include a control of referring to the information pieces, acquiring, from among the time periods during each of which the free running operation or the braking operation is performed, a time period corresponding to the detected voltage value or the detected average voltage value, and determining the acquired time period as the time period during which the free running operation or the braking operation is performed.

Also, the image processing apparatus may further comprise: a storage unit storing therein information pieces each indicating a correspondence between (i) a difference obtained by subtracting a predetermined value Vdmin from a voltage value of the signal or an average of voltage values of the signal and (ii) a time period during which the free running operation or the braking operation is performed, wherein the first control may include a control of referring to the information pieces, acquiring, from among the time periods during each of which the free running operation or the braking operation is performed, a time period corresponding to a difference obtained by subtracting the predetermined value Vdmin from the detected voltage value or the detected average voltage value, and determining the acquired time period as the time period during which the free running operation or the braking operation is performed, and the predetermined value Vdmin may correspond to a voltage value of the signal or an average of voltage values of the signal assumed to be detected when the drive load of the motor is at minimum.

Furthermore, the image processing apparatus may further comprise: a storage unit storing therein information pieces each indicating a correspondence between (i) a difference obtained by subtracting a voltage value of the signal or an average of voltage values of the signal from a predetermined value Vdmax and (ii) a time period during which the free running operation or the braking operation is performed, wherein the first control may include a control of referring to the information pieces, acquiring, from among the time periods during each of which the free running operation or the braking operation is performed, a time period corresponding to a difference obtained by subtracting the detected voltage value or the detected average voltage value from the predetermined value Vdmax, and determining the acquired time period as the time period during which the free running operation or the braking operation is performed, and the predetermined value Vdmax may correspond to a voltage value of the signal or an average of voltage values of the signal assumed to be detected when the drive load of the motor is at maximum.

Also, the control unit may give the instruction to either increase or reduce the amount of electric current by variably changing a PWM value of the signal, and the load detection unit may acquire one PWM value of the signal or a plurality of PWM values of the signal before the speed reduction control, and may detect the one PWM value or an average of the plurality of PWM values as the amount of electric current.

Furthermore, the image processing apparatus may further comprise a storage unit storing therein information pieces each indicating a correspondence between (i) a PWM value of the signal or an average of PWM values of the signal and (ii) a time period during which the free running operation or the braking operation is performed, wherein the first control may include a control of referring to the information pieces, acquiring, from among the time periods during each of which the free running operation or the braking operation is performed, a time period corresponding to the detected PWM value or the detected average PWM value, and determining the acquired time period as the time period during which the free running operation or the braking operation is performed.

Also, the image processing apparatus may further comprise a storage unit storing therein information pieces each indicating a correspondence between (i) a difference obtained by subtracting a predetermined value PWMmin from a PWM value of the signal or an average of PWM values of the signal and (ii) a time period during which the free running operation or the braking operation is performed, wherein the first control may include a control of referring to the information pieces, acquiring, from among the time periods during each of which the free running operation or the braking operation is performed, a time period corresponding to a difference obtained by subtracting the predetermined value PWMmin from the detected PWM value or the detected average PWM value, and determining the acquired time period as the time period during which the free running operation or the braking operation is performed, and the predetermined value PWMmin may correspond to a PWM value of the signal or an average of PWM values of the signal assumed to be detected when the drive load of the motor is at minimum.

Furthermore, the image processing apparatus may further comprise a storage unit storing therein information pieces each indicating a correspondence between (i) a difference obtained by subtracting a PWM value of the signal or an average of PWM values of the signal from a predetermined value PWMmax and (ii) a time period during which the free running operation or the braking operation is performed, wherein the first control may include a control of referring to the information pieces, acquiring, from among the time periods during each of which the free running operation or the braking operation is performed, a time period corresponding to a difference obtained by subtracting the detected PWM value or the detected average PWM value from the predetermined value PWMmax, and determining the acquired time period as the time period during which the free running operation or the braking operation is performed, and the predetermined value PWMmax may correspond to a PWM value of the signal or an average of PWM values of the signal assumed to be detected when the drive load of the motor is at maximum.

Also, the image processing apparatus may further comprise a storage unit storing therein information pieces each indicating a correspondence between (i) an amount of the drive load of the motor and (ii) a time period during which the free running operation or the braking operation is performed, wherein the first control may include a control of referring to the information pieces, acquiring, from among the time periods during each of which the free running operation or the braking operation is performed, a time period corresponding to the detected amount of the drive load of the motor, and determining the acquired time period as the time period during which the free running operation or the braking operation is performed.

Furthermore, the first control may include a feedback control, the feedback control being a control of alternately switching the braking operation and the powering operation so that the rotation speed of the motor is reduced according to a reference speed reduction rate between a time period from the start of the speed reduction control of the motor to when the rotation speed of the motor is reduced to the reference speed.

Also, the reference speed reduction rate may indicate a speed reduction rate when the drive load of the motor is at minimum and the rotation speed of the motor is assumed to be reduced only by the braking operation from the start of the speed reduction control.

Furthermore, the feedback control may include a control of detecting the rotation speed of the motor at predetermined intervals, and in the feedback control, every time the rotation speed of the motor is detected, a difference D may be obtained by subtracting the detected rotation speed from a reference rotation speed that is a speed at a time of the detection when the rotation speed of the motor is assumed to be reduced at the reference speed reduction rate, and when the difference D is smaller or equal to a first threshold value, which is a negative value, the braking operation may be performed, and when the difference D is larger than or equal to a second threshold value, which is a positive value, the powering operation may be performed.

Also, the feedback control may include a control of detecting the rotation amount of the motor from the start of the speed reduction control at predetermined intervals, and in the feedback control, every time the rotation amount of the motor is detected, a difference Dp may be obtained by subtracting the detected rotation amount from a reference rotation amount that is the rotation amount of the motor at a time of the detection when the rotation speed of the motor is assumed to be reduced at the reference speed reduction rate, and when the difference Dp is smaller or equal to a first threshold value, which is a negative value, the braking operation may be performed, and when the difference Dp is larger than or equal to a second threshold value, which is a positive value, the powering operation may be performed.

Furthermore, the feedback control may include a control of detecting the rotation speed of the motor at predetermined intervals and detecting the rotation amount of the motor from the start of the speed reduction control at predetermined intervals, and in the feedback control, every time the rotation amount of the motor is detected, a difference Dp may be obtained by subtracting the detected rotation amount from a reference rotation amount that is the rotation amount of the motor at a time of the detection when the rotation speed of the motor is assumed to be reduced at the reference speed reduction rate, and when the difference Dp is smaller or equal to a first threshold value, which is a negative value, the braking operation may be performed, and every time the rotation speed of the motor is detected, a difference D may be obtained by subtracting the detected rotation speed from a reference rotation speed that is a speed at a time of the detection when the rotation speed of the motor is assumed to be reduced at the reference speed reduction rate, and when the difference D is larger than or equal to a second threshold value, which is a positive value, the powering operation may be performed.

Also, the feedback control may include a control of detecting the rotation speed of the motor at predetermined intervals and detecting the rotation amount of the motor from the start of the speed reduction control at predetermined intervals, and in the feedback control, every time the rotation speed of the motor is detected, a difference D may be obtained by subtracting the detected rotation speed from a reference rotation speed that is a speed at a time of the detection when the rotation speed of the motor is assumed to be reduced at the reference speed reduction rate, and when the difference D is smaller or equal to a first threshold value, which is a negative value, the braking operation may be performed, and every time the rotation amount of the motor is detected, a difference Dp may be obtained by subtracting the detected rotation amount from a reference rotation amount that is the rotation amount of the motor at a time of the detection when the rotation speed of the motor is assumed to be reduced at the reference speed reduction rate, and when the difference Dp is larger than or equal to a second threshold value, which is a positive value, the powering operation may be performed.

Furthermore, a rotation speed Vc2 may denote a predetermined rotation speed lower than the rotation speed Vct and higher than the reference speed, and during the first control, when the rotation amount of the motor from the start of the speed reduction control reaches the reference value on or before a time point at which the rotation speed of the motor is reduced to the rotation speed Vc2, the speed reduction unit may abort the first control, and may perform the second control to start the braking operation.

Also, the first control may include a control of performing the powering operation on the motor so that the rotation speed of the motor is maintained at the reference speed, when the following conditions are satisfied: the rotation speed of the motor is reduced to the reference speed; and the rotation amount of the motor has not yet reached the reference value, the powering operation being performed until the rotation amount reaches the reference value.

Furthermore, the motor may be a DC brushless motor.

Also, the braking operation may be a short braking operation performed on the motor.

Furthermore, the image processing apparatus may further comprise either a pair of registration rollers configured to transport the sheet to a transfer position at a timing of forming an image on an image carrier or a pair of registration rollers configured to transport the sheet to a reading position at a timing of reading an image on the sheet, wherein the transport roller may be arranged more upstream in a sheet transport direction than the pair of registration rollers, and may transport the sheet to the pair of registration rollers.

A second aspect of the present invention is a rotation control method for a motor provided in an image processing apparatus, the image processing apparatus including a transport roller that is driven to rotate by the motor and that is for transporting a sheet subjected to image processing, the rotation control method comprising a speed reduction step of performing a speed reduction control on the motor to temporarily stop the sheet that is being transported, the speed reduction control being performed in a manner that a stopping time and a stopping distance each satisfy a corresponding target range, the stopping time being a time period from a start of the speed reduction control to a stop of the sheet, and the stopping distance being a distance traveled by the sheet from the start of the speed reduction control to the stop of the sheet, wherein the speed reduction step includes a first control step and a second control step following the first control step, the first control step is a step of reducing a rotation speed of the motor to a reference speed through at least two operations from among a braking operation, a powering operation, and a free running operation, the at least two operations including the braking operation, and the reference speed being a speed lower than a rotation speed Vct that is a speed of the motor at the start of the speed reduction control, and the second control step is a step of, after a rotation amount of the motor from the start of the speed reduction control reaches a reference value, continuously performing the braking operation until the stop of the motor.

A third aspect of the present invention is a non-transitory computer-readable recording medium storing thereon a computer program for controlling an image processing apparatus, the image processing apparatus including a motor and a transport roller that is driven to rotate by the motor and that is for transporting a sheet subjected to image processing, the computer program causing the image processing apparatus to perform a speed reduction step of performing a speed reduction control on the motor to temporarily stop the sheet that is being transported, the speed reduction control being performed in a manner that a stopping time and a stopping distance each satisfy a corresponding target range, the stopping time being a time period from a start of the speed reduction control to a stop of the sheet, and the stopping distance being a distance traveled by the sheet from the start of the speed reduction control to the stop of the sheet, wherein the speed reduction step includes a first control step and a second control step following the first control step, the first control step is a step of reducing a rotation speed of the motor to a reference speed through at least two operations from among a braking operation, a powering operation, and a free running operation, the at least two operations including the braking operation, and the reference speed being a speed lower than a rotation speed Vct that is a speed of the motor at the start of the speed reduction control, and the second control step is a step of, after a rotation amount of the motor from the start of the speed reduction control reaches a reference value, continuously performing the braking operation until the stop of the motor.

With the above structure, the speed reduction control is performed by a combination of operations, such as the braking operation and the powering operation, during the time period from the start of the speed reduction control to when the motor rotation speed is reduced to the reference speed. After the motor rotation speed is reduced to the reference speed, and the rotation amount of the motor from the start of the speed reduction control reaches the reference value, the braking operation is continuously performed until the stop of the motor.

The reference speed is set to fall within the high-speed period rather than the low-speed period in which variations in the stopping distance and the stopping time occur. In this way, a speed adjustment control is not performed in the low-speed period which immediately precedes the stop of the motor. This suppresses variations in the stopping distance and the stopping time caused by the speed adjustment control in the low-speed period.

In a case where the braking operation is performed without the speed adjustment control after the motor rotation speed is reduced to the reference speed, the stopping distance and the stopping time are determined according to the timing at which the braking operation is started, and the timing of the start of the braking operation is determined according to the magnitude of the reference speed and the reference value.

Accordingly, the reference speed and the reference value are determined in advance in a manner that the stopping distance and the stopping time from the start of the speed reduction control of the motor to the stop of the motor fall within the respective target ranges. In this way, even if the drive load of the motor is varied, variations in the stopping distance and the stopping time during the speed reduction control of the motor are suppressed, and the speed reduction control is thus performed appropriately.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus including a transport roller for transporting a sheet subjected to image processing, the image processing apparatus comprising:
   a motor configured to drive the transport roller to rotate; and
   a speed reduction unit configured to perform a speed reduction control on the motor to temporarily stop the sheet that is being transported, the speed reduction control being performed in a manner that a stopping time and a stopping distance each satisfy a corresponding target range, the stopping time being a time period from a start of the speed reduction control to a stop of the sheet, and the stopping distance being a distance traveled by the sheet from the start of the speed reduction control to the stop of the sheet, wherein
   the speed reduction control includes a first control and a second control following the first control,
   the first control is a control of reducing a rotation speed of the motor to a reference speed through at least two operations from among a braking operation, a powering operation, and a free running operation, the at least two operations including the braking operation, and the reference speed being a speed lower than a rotation speed Vct that is a speed of the motor at the start of the speed reduction control, and
   the second control is a control of, after a rotation amount of the motor from the start of the speed reduction control reaches a reference value, continuously performing the braking operation until the stop of the motor.

2. The image processing apparatus of claim 1, wherein in the first control,
   after the rotation speed of the motor reaches the reference speed, the rotation speed is maintained at the reference speed by the powering operation until the rotation amount from the start of the speed reduction control reaches the reference value.

3. The image processing apparatus of claim 1 further comprising
   a load detection unit configured to detect an amount of a drive load of the motor, wherein
   the first control includes a control of: determining, in accordance with the detected amount of the drive load, a time period during which the free running operation or the braking operation is performed; performing the free running operation or the braking operation for the determined time period from the start of the speed reduction control; and after the determined time period, performing the braking operation or the free running operation until the rotation speed of the motor is reduced to the reference speed.

4. The image processing apparatus of claim 3 further comprising
   a control unit configured to, before the speed reduction control, variably control an amount of electric current flowing into the motor such that the rotation speed of the motor is maintained at a predetermined speed corresponding to a speed at which the sheet is transported, wherein
   the load detection unit acquires, while the sheet is being transported before the speed reduction control, information indicating the amount of electric current flowing into the motor, and detects the amount of the drive load based on the acquired information.

5. The image processing apparatus of claim 4, wherein the control unit gives an instruction to the motor to increase the amount of electric current flowing into the motor when a current rotation speed of the motor is lower than the predetermined speed, and gives an instruction to the motor to reduce the amount of electric current flowing into the motor when the current rotation speed of the motor is higher than the predetermined speed,
   the information indicating the amount of electric current flowing into the motor is a signal indicating the amount of electric current indicated by the instruction from the control unit to the motor, and
   the load detection unit detects the amount of electric current instructed by the control unit to the motor as the amount of the drive load.

6. The image processing apparatus of claim 5, wherein the control unit gives the instruction to either increase or reduce the amount of electric current by variably changing a voltage value of the signal, and
   the load detection unit acquires one voltage value of the signal or a plurality of voltage values of the signal before the speed reduction control, and detects the one voltage value or an average of the plurality of voltage values as the amount of electric current.

7. The image processing apparatus of claim 6 further comprising
a storage unit storing therein information pieces each indicating a correspondence between (i) a voltage value of the signal or an average of voltage values of the signal and (ii) a time period during which the free running operation or the braking operation is performed, wherein
the first control includes a control of referring to the information pieces, acquiring, from among the time periods during each of which the free running operation or the braking operation is performed, a time period corresponding to the detected voltage value or the detected average voltage value, and determining the acquired time period as the time period during which the free running operation or the braking operation is performed.

8. The image processing apparatus of claim 6 further comprising:
a storage unit storing therein information pieces each indicating a correspondence between (i) a difference obtained by subtracting a predetermined value Vdmin from a voltage value of the signal or an average of voltage values of the signal and (ii) a time period during which the free running operation or the braking operation is performed, wherein
the first control includes a control of referring to the information pieces, acquiring, from among the time periods during each of which the free running operation or the braking operation is performed, a time period corresponding to a difference obtained by subtracting the predetermined value Vdmin from the detected voltage value or the detected average voltage value, and determining the acquired time period as the time period during which the free running operation or the braking operation is performed, and
the predetermined value Vdmin corresponds to a voltage value of the signal or an average of voltage values of the signal assumed to be detected when the drive load of the motor is at minimum.

9. The image processing apparatus of claim 6 further comprising:
a storage unit storing therein information pieces each indicating a correspondence between (i) a difference obtained by subtracting a voltage value of the signal or an average of voltage values of the signal from a predetermined value Vdmax and (ii) a time period during which the free running operation or the braking operation is performed, wherein
the first control includes a control of referring to the information pieces, acquiring, from among the time periods during each of which the free running operation or the braking operation is performed, a time period corresponding to a difference obtained by subtracting the detected voltage value or the detected average voltage value from the predetermined value Vdmax, and determining the acquired time period as the time period during which the free running operation or the braking operation is performed, and
the predetermined value Vdmax corresponds to a voltage value of the signal or an average of voltage values of the signal assumed to be detected when the drive load of the motor is at maximum.

10. The image processing apparatus of claim 5, wherein
the control unit gives the instruction to either increase or reduce the amount of electric current by variably changing a PWM value of the signal, and
the load detection unit acquires one PWM value of the signal or a plurality of PWM values of the signal before the speed reduction control, and detects the one PWM value or an average of the plurality of PWM values as the amount of electric current.

11. The image processing apparatus of claim 10 further comprising
a storage unit storing therein information pieces each indicating a correspondence between (i) a PWM value of the signal or an average of PWM values of the signal and (ii) a time period during which the free running operation or the braking operation is performed, wherein
the first control includes a control of referring to the information pieces, acquiring, from among the time periods during each of which the free running operation or the braking operation is performed, a time period corresponding to the detected PWM value or the detected average PWM value, and determining the acquired time period as the time period during which the free running operation or the braking operation is performed.

12. The image processing apparatus of claim 10 further comprising
a storage unit storing therein information pieces each indicating a correspondence between (i) a difference obtained by subtracting a predetermined value PWMmin from a PWM value of the signal or an average of PWM values of the signal and (ii) a time period during which the free running operation or the braking operation is performed, wherein
the first control includes a control of referring to the information pieces, acquiring, from among the time periods during each of which the free running operation or the braking operation is performed, a time period corresponding to a difference obtained by subtracting the predetermined value PWMmin from the detected PWM value or the detected average PWM value, and determining the acquired time period as the time period during which the free running operation or the braking operation is performed, and
the predetermined value PWMmin corresponds to a PWM value of the signal or an average of PWM values of the signal assumed to be detected when the drive load of the motor is at minimum.

13. The image processing apparatus of claim 10 further comprising
a storage unit storing therein information pieces each indicating a correspondence between (i) a difference obtained by subtracting a PWM value of the signal or an average of PWM values of the signal from a predetermined value PWMmax and (ii) a time period during which the free running operation or the braking operation is performed, wherein
the first control includes a control of referring to the information pieces, acquiring, from among the time periods during each of which the free running operation or the braking operation is performed, a time period corresponding to a difference obtained by subtracting the detected PWM value or the detected average PWM value from the predetermined value PWMmax, and determining the acquired time period as the time period during which the free running operation or the braking operation is performed, and
the predetermined value PWMmax corresponds to a PWM value of the signal or an average of PWM values of the signal assumed to be detected when the drive load of the motor is at maximum.

14. The image processing apparatus of claim 3 further comprising
a storage unit storing therein information pieces each indicating a correspondence between (i) an amount of the drive load of the motor and (ii) a time period during which the free running operation or the braking operation is performed, wherein
the first control includes a control of referring to the information pieces, acquiring, from among the time periods during each of which the free running operation or the braking operation is performed, a time period corresponding to the detected amount of the drive load of the motor, and determining the acquired time period as the time period during which the free running operation or the braking operation is performed.

15. The image processing apparatus of claim 1, wherein
the first control includes a feedback control, the feedback control being a control of alternately switching the braking operation and the powering operation so that the rotation speed of the motor is reduced according to a reference speed reduction rate between a time period from the start of the speed reduction control of the motor to when the rotation speed of the motor is reduced to the reference speed.

16. The image processing apparatus of claim 15, wherein
the reference speed reduction rate indicates a speed reduction rate when the drive load of the motor is at minimum and the rotation speed of the motor is assumed to be reduced only by the braking operation from the start of the speed reduction control.

17. The image processing apparatus of claim 15, wherein
the feedback control includes a control of detecting the rotation speed of the motor at predetermined intervals, and
in the feedback control, every time the rotation speed of the motor is detected, a difference D is obtained by subtracting the detected rotation speed from a reference rotation speed that is a speed at a time of the detection when the rotation speed of the motor is assumed to be reduced at the reference speed reduction rate, and when the difference D is smaller or equal to a first threshold value, which is a negative value, the braking operation is performed, and when the difference D is larger than or equal to a second threshold value, which is a positive value, the powering operation is performed.

18. The image processing apparatus of claim 15, wherein
the feedback control includes a control of detecting the rotation amount of the motor from the start of the speed reduction control at predetermined intervals, and
in the feedback control, every time the rotation amount of the motor is detected, a difference Dp is obtained by subtracting the detected rotation amount from a reference rotation amount that is the rotation amount of the motor at a time of the detection when the rotation speed of the motor is assumed to be reduced at the reference speed reduction rate, and when the difference Dp is smaller or equal to a first threshold value, which is a negative value, the braking operation is performed, and when the difference Dp is larger than or equal to a second threshold value, which is a positive value, the powering operation is performed.

19. The image processing apparatus of claim 15, wherein
the feedback control includes a control of detecting the rotation speed of the motor at predetermined intervals and detecting the rotation amount of the motor from the start of the speed reduction control at predetermined intervals, and
in the feedback control,
every time the rotation amount of the motor is detected, a difference Dp is obtained by subtracting the detected rotation amount from a reference rotation amount that is the rotation amount of the motor at a time of the detection when the rotation speed of the motor is assumed to be reduced at the reference speed reduction rate, and when the difference Dp is smaller or equal to a first threshold value, which is a negative value, the braking operation is performed, and
every time the rotation speed of the motor is detected, a difference D is obtained by subtracting the detected rotation speed from a reference rotation speed that is a speed at a time of the detection when the rotation speed of the motor is assumed to be reduced at the reference speed reduction rate, and when the difference D is larger than or equal to a second threshold value, which is a positive value, the powering operation is performed.

20. The image processing apparatus of claim 15, wherein
the feedback control includes a control of detecting the rotation speed of the motor at predetermined intervals and detecting the rotation amount of the motor from the start of the speed reduction control at predetermined intervals, and
in the feedback control,
every time the rotation speed of the motor is detected, a difference D is obtained by subtracting the detected rotation speed from a reference rotation speed that is a speed at a time of the detection when the rotation speed of the motor is assumed to be reduced at the reference speed reduction rate, and when the difference D is smaller or equal to a first threshold value, which is a negative value, the braking operation is performed, and
every time the rotation amount of the motor is detected, a difference Dp is obtained by subtracting the detected rotation amount from a reference rotation amount that is the rotation amount of the motor at a time of the detection when the rotation speed of the motor is assumed to be reduced at the reference speed reduction rate, and when the difference Dp is larger than or equal to a second threshold value, which is a positive value, the powering operation is performed.

21. The image processing apparatus of claim 1, wherein
a rotation speed Vc2 denotes a predetermined rotation speed lower than the rotation speed Vct and higher than the reference speed, and
during the first control, when the rotation amount of the motor from the start of the speed reduction control reaches the reference value on or before a time point at which the rotation speed of the motor is reduced to the rotation speed Vc2, the speed reduction unit aborts the first control, and performs the second control to start the braking operation.

22. The image processing apparatus of claim 1, wherein
the first control includes a control of performing the powering operation on the motor so that the rotation speed of the motor is maintained at the reference speed, when the following conditions are satisfied: the rotation speed of the motor is reduced to the reference speed; and the rotation amount of the motor has not yet reached the reference value, the powering operation being performed until the rotation amount reaches the reference value.

23. The image processing apparatus of claim 1, wherein
the motor is a DC brushless motor.

24. The image processing apparatus of claim 1, wherein the braking operation is a short braking operation performed on the motor.

25. The image processing apparatus of claim 1 further comprising
either a pair of registration rollers configured to transport the sheet to a transfer position at a timing of forming an image on an image carrier or a pair of registration rollers configured to transport the sheet to a reading position at a timing of reading an image on the sheet, wherein
the transport roller is arranged more upstream in a sheet transport direction than the pair of registration rollers, and transports the sheet to the pair of registration rollers.

26. A rotation control method for a motor provided in an image processing apparatus, the image processing apparatus including a transport roller that is driven to rotate by the motor and that is for transporting a sheet subjected to image processing, the rotation control method comprising
a speed reduction step of performing a speed reduction control on the motor to temporarily stop the sheet that is being transported, the speed reduction control being performed in a manner that a stopping time and a stopping distance each satisfy a corresponding target range, the stopping time being a time period from a start of the speed reduction control to a stop of the sheet, and the stopping distance being a distance traveled by the sheet from the start of the speed reduction control to the stop of the sheet, wherein
the speed reduction step includes a first control step and a second control step following the first control step,
the first control step is a step of reducing a rotation speed of the motor to a reference speed through at least two operations from among a braking operation, a powering operation, and a free running operation, the at least two operations including the braking operation, and the reference speed being a speed lower than a rotation speed Vct that is a speed of the motor at the start of the speed reduction control, and
the second control step is a step of, after a rotation amount of the motor from the start of the speed reduction control reaches a reference value, continuously performing the braking operation until the stop of the motor.

27. A non-transitory computer-readable recording medium storing thereon a computer program for controlling an image processing apparatus, the image processing apparatus including a motor and a transport roller that is driven to rotate by the motor and that is for transporting a sheet subjected to image processing, the computer program causing the image processing apparatus to perform
a speed reduction step of performing a speed reduction control on the motor to temporarily stop the sheet that is being transported, the speed reduction control being performed in a manner that a stopping time and a stopping distance each satisfy a corresponding target range, the stopping time being a time period from a start of the speed reduction control to a stop of the sheet, and the stopping distance being a distance traveled by the sheet from the start of the speed reduction control to the stop of the sheet, wherein
the speed reduction step includes a first control step and a second control step following the first control step,
the first control step is a step of reducing a rotation speed of the motor to a reference speed through at least two operations from among a braking operation, a powering operation, and a free running operation, the at least two operations including the braking operation, and the reference speed being a speed lower than a rotation speed Vct that is a speed of the motor at the start of the speed reduction control, and
the second control step is a step of, after a rotation amount of the motor from the start of the speed reduction control reaches a reference value, continuously performing the braking operation until the stop of the motor.

* * * * *